(12) United States Patent
Ghiorghie et al.

(10) Patent No.: US 11,388,997 B1
(45) Date of Patent: Jul. 19, 2022

(54) ACCESSORY FLIP LOCK FOR VERTICAL POLE

(71) Applicant: InterDesign, Inc., Solon, OH (US)

(72) Inventors: Radu Alexandru Ghiorghie, Copley, OH (US); Sara Czukal McBride, Wickliffe, OH (US)

(73) Assignee: InterDesign, Inc., Solon, OH (US)

( * ) Notice: Subject to any disclaimer, the term of this patent is extended or adjusted under 35 U.S.C. 154(b) by 0 days.

(21) Appl. No.: 16/988,129

(22) Filed: Aug. 7, 2020

Related U.S. Application Data

(63) Continuation-in-part of application No. 29/727,206, filed on Mar. 9, 2020, now Pat. No. Des. 941,633.

(60) Provisional application No. 62/943,929, filed on Dec. 5, 2019, provisional application No. 62/884,721, filed on Aug. 9, 2019.

(51) Int. Cl.
| | |
|---|---|
| *A47B 96/06* | (2006.01) |
| *A47B 57/56* | (2006.01) |
| *A47G 1/16* | (2006.01) |
| *F16B 2/18* | (2006.01) |
| *F16B 12/20* | (2006.01) |
| *A47B 57/54* | (2006.01) |

(52) U.S. Cl.
CPC .............. *A47B 96/06* (2013.01); *A47B 57/54* (2013.01); *A47B 57/56* (2013.01); *A47G 1/1653* (2013.01); *F16B 2/185* (2013.01); *F16B 12/20* (2013.01)

(58) Field of Classification Search
CPC ....... A47B 57/06; A47B 57/26; A47B 57/265; A47B 57/30; A47B 57/54; A47B 57/545; A47B 57/56; A47B 96/06; A47B 96/024; A47B 96/022; A47G 1/1653; F16B 2/185; F16B 12/20; F16M 11/28
USPC .... 211/187, 103, 190, 207, 175, 208, 133.3; 108/147.11–147.15, 147.18, 106, 107; 248/41–412, 414
See application file for complete search history.

(56) References Cited

U.S. PATENT DOCUMENTS

| | | | |
|---|---|---|---|
| 6,017,009 A * | 1/2000 | Swartz | A47B 57/10 |
| | | | 108/147.13 |
| 6,113,042 A | 9/2000 | Welsch et al. | |
| 7,086,633 B2 * | 8/2006 | Welch | A47B 57/265 |
| | | | 108/147.13 |
| 7,267,310 B2 | 9/2007 | Welch et al. | |
| D566,991 S | 4/2008 | Harwanko | |
| D568,658 S | 5/2008 | Yang et al. | |
| 7,401,754 B2 * | 7/2008 | Welch | A47B 57/545 |
| | | | 108/110 |
| 7,478,971 B2 | 1/2009 | Li | |
| D651,837 S | 1/2012 | Yang et al. | |
| D651,838 S | 1/2012 | Yang et al. | |

(Continued)

FOREIGN PATENT DOCUMENTS

| | | | |
|---|---|---|---|
| CN | 101108076 | * | 1/2008 |
| CN | 109567435 | * | 4/2019 |

(Continued)

*Primary Examiner* — Janet M Wilkens
(74) *Attorney, Agent, or Firm* — Calfee, Halter & Griswold LLP

(57) ABSTRACT

A device for securing accessories such as bins, hooks, shelves, mirrors, trays, and baskets to a vertical support pole without tools and without a separate wedge or collar, including two fully separable pieces that interlock to surround the support pole and a lever that tightens to the pole without the use of a separate sleeve or wedge and without using tools.

9 Claims, 29 Drawing Sheets

(56) References Cited

U.S. PATENT DOCUMENTS

| | | | |
|---|---|---|---|
| 8,225,946 B2 | 7/2012 | Yang et al. | |
| 8,408,405 B2 | 4/2013 | Yang et al. | |
| 8,616,138 B1* | 12/2013 | Fu | A47B 57/545 |
| | | | 108/147.13 |
| 8,763,821 B2 | 7/2014 | Yang et al. | |
| 9,107,495 B2 | 8/2015 | Lindo et al. | |
| 9,107,496 B2 | 8/2015 | Lindo et al. | |
| 9,200,651 B2 | 12/2015 | Lin | |
| 9,249,818 B2 | 2/2016 | Sabounjian | |
| 9,357,860 B1 | 6/2016 | Klowan | |
| 9,883,742 B2* | 2/2018 | Yang | A47K 3/281 |
| 9,943,192 B2 | 4/2018 | Yang et al. | |
| 10,034,587 B1* | 7/2018 | Elliot | A47B 96/022 |
| 2004/0155160 A1* | 8/2004 | Welch | A47B 57/265 |
| | | | 248/218.4 |
| 2006/0042522 A1* | 3/2006 | Trubiano | A47B 57/10 |
| | | | 108/110 |
| 2006/0226313 A1* | 10/2006 | Welch | A47B 57/265 |
| | | | 248/218.4 |
| 2007/0235611 A1* | 10/2007 | Riblet | E04G 5/062 |
| | | | 248/248 |
| 2008/0185357 A1 | 8/2008 | Chen | |
| 2009/0188880 A1* | 7/2009 | Yang | A47K 3/281 |
| | | | 211/113 |
| 2012/0217215 A1 | 8/2012 | Emery et al. | |
| 2014/0284293 A1 | 9/2014 | Greco | |
| 2016/0374467 A1 | 12/2016 | Gasparino | |
| 2017/0086452 A1* | 3/2017 | Brooks | A01M 31/00 |
| 2017/0224106 A1* | 8/2017 | Sabounjian | A47B 57/545 |

FOREIGN PATENT DOCUMENTS

| | | | |
|---|---|---|---|
| KR | 200377295 | * | 3/2005 |
| KR | 100909253 | * | 7/2009 |
| KR | 20090131760 | * | 12/2009 |
| KR | 20100006691 | * | 7/2010 |
| KR | 200471826 | * | 3/2014 |
| WO | 2009097298 | * | 8/2009 |
| WO | 2015138257 | | 9/2015 |
| WO | 2017136780 | | 8/2017 |

* cited by examiner

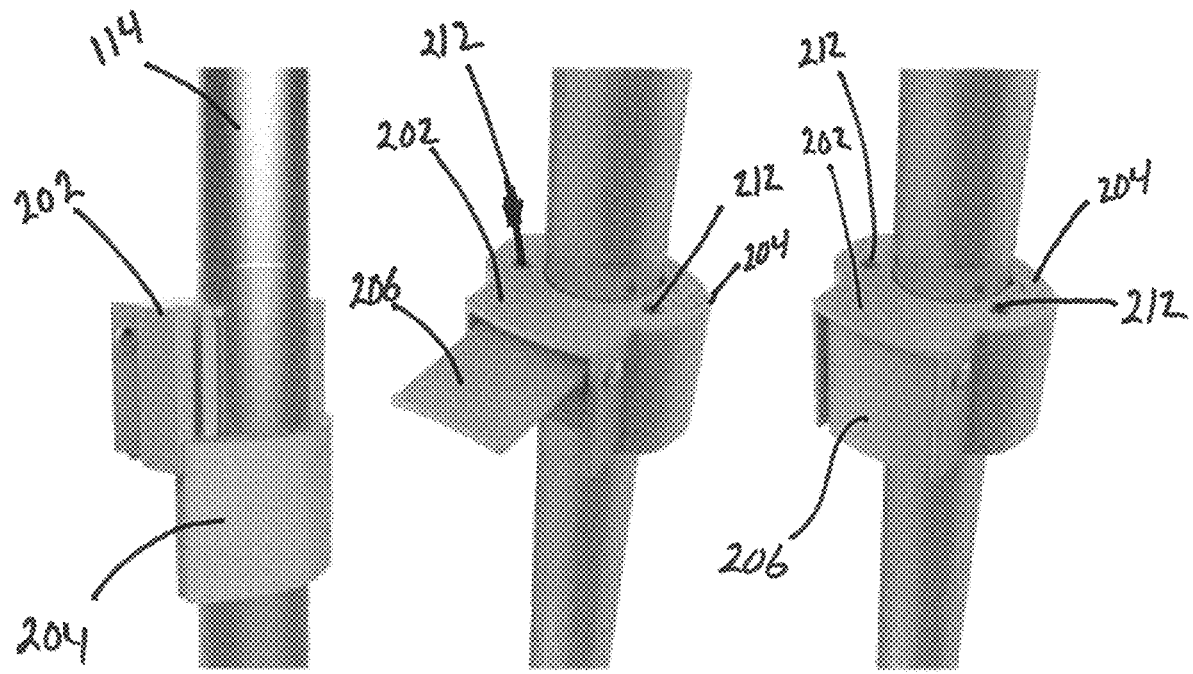
Position basket on pole
Move basket to desired location on pole
Push lever down to secure basket in place
Fig. 2a  Fig. 2b  Fig. 2c

ACCESSORY FLIP LOCK FOR VERTICAL POLE

RELATED APPLICATIONS

This application claims priority to, and any other benefit of, U.S. Prov'l Pat. Appl'n Ser. No. 62/884,721, filed Aug. 9, 2019 and U.S. Prov'l Pat. Appl'n Ser. No. 62/943,929, filed Dec. 5, 2019, the entire disclosures of which are incorporated by reference as though recited herein in their entireties. This application is also a continuation-in-part of U.S. Appl'n Ser. No. 29/727,206, filed on Mar. 9, 2020, the entire disclosure of which is incorporated by reference herein as though recited herein in its entirety.

FIELD

The inventive concepts relate generally to devices for securing accessories (bins, hooks, shelves, mirrors, trays, baskets, etc.) to a vertical pole without tools.

BACKGROUND

Vertical pole organizers are known and are called various names, such as tension rod caddies, tension pole caddies, tension shower caddies, tension pole shower caddies, and the like. One or more accessories (bins, hooks, shelves, mirrors, trays, baskets (bins formed from wire or other mesh), etc.) are typically secured to the pole. Exemplary devices used to secure an accessory to a vertical pole are shown in U.S. Pat. No. 9,693,660, which is assigned to the Applicant of this case.

SUMMARY

The present application discloses attachment methods for bath and shower storage and other organization systems. An accessory lock for a vertical pole provides a device for quickly securing shelves, hooks, and other accessories to a vertical pipe or pole.

In exemplary embodiments, an accessory lock includes two fully separable pieces that interlock to surround the support pole and a lever (i.e., a lever per se or some other latch) that tightens the accessory to the pole without the use of a sleeve or wedge and without the use of tools. In exemplary embodiments, the lock secures one or more accessories to a vertical support pole, such as a bin, a hook, a shelf, a mirror, a tray, or a basket, etc. without the use of a sleeve or wedge and without the use of tools.

In some exemplary embodiments, the accessory lock is configured with receiving pockets to receive posts formed in a shelf or other attachment. In another exemplary embodiment, an accessory lock comprises a first and second frame piece that fit together to surround a pole and can be clamped to a pole without the need for tools. The accessory lock further comprises a tension device that engages the pole and a cam lever that applies pressure to the tension device. In other exemplary embodiments, the accessory lock further comprises an integral hook or hanger. In still other exemplary embodiments, a shelf or bin is integrated into the accessory lock. Exemplary embodiments of the accessory lock comprise a shell which is formed from a cam clip and a cam bracket, the cam clip and cam bracket configured to be assembled together without tools to surround a pipe or pole, a cam lever that serves to engage the pipe or pole, and a tension plate that is pressed against the pipe or pole by the tab lever.

Exemplary embodiments may comprise integral hooks to support bins and other accessories. Other exemplary embodiments comprise bin locks that are configured to include a shelf frame into which various inserts and fences may be installed to provide additional storage functionality.

Exemplary embodiments may comprise a clip, a bracket that removably connects to the cam clip to form a space therebetween, and a latch connected to the bracket that, when actuated, reduces a size of the space therebetween, the clip and bracket connectable without the need for tools.

Exemplary embodiments may comprise a bracket that removably connects to a clip to form a space therebetween to accept a pole and further wherein the latch, when actuated secures the pole between the clip and bracket, the clip and bracket connectable without the need for tools.

In some exemplary embodiments the latch comprises a lever pivotally connected to the bracket that, when actuated, reduces the size of the space between the clip and bracket.

In some exemplary embodiments, the accessory lock removably accepts or has secured thereto a bin, basket, shelf, hook or other item.

Some exemplary embodiments comprise a method of securing a bin, basket, shelf, hook or other item to a pole comprising, positioning one of a clip and a bracket against a surface the pole, attaching the other of the clip and bracket thereto, without the need for tools, to secure the clip and the bracket around the pole, and actuating a latch of the bracket to secure the pole between the clip and bracket to secure the bin, basket, shelf, hook or other item to the pole.

In some exemplary embodiments, an accessory lock and/or clip/bracket is secured to the pole with the latch/lever without insertion of a separate sleeve, a separate wedge, or other separate structure against the pole.

BRIEF DESCRIPTION OF THE DRAWINGS

These and other features of the general inventive concept will become better understood with regard to the following description and accompanying drawings in which:

FIGS. 2a-2d illustrate the installation of an accessory lock according to an exemplary embodiment;

FIG. 9b illustrates a cutaway view of the accessory lock of FIG. 9a;

FIG. 10b illustrates a cutaway view of the accessory lock of FIG. 10a;

DETAILED DESCRIPTION

This detailed description merely describes exemplary embodiments of the invention and is not intended to limit the scope of the invention in any way. Indeed, the contemplated invention is broader than the exemplary embodiments. The terms used in any future claims have their full ordinary meaning unless an express definition is provided herein.

Figure 1:
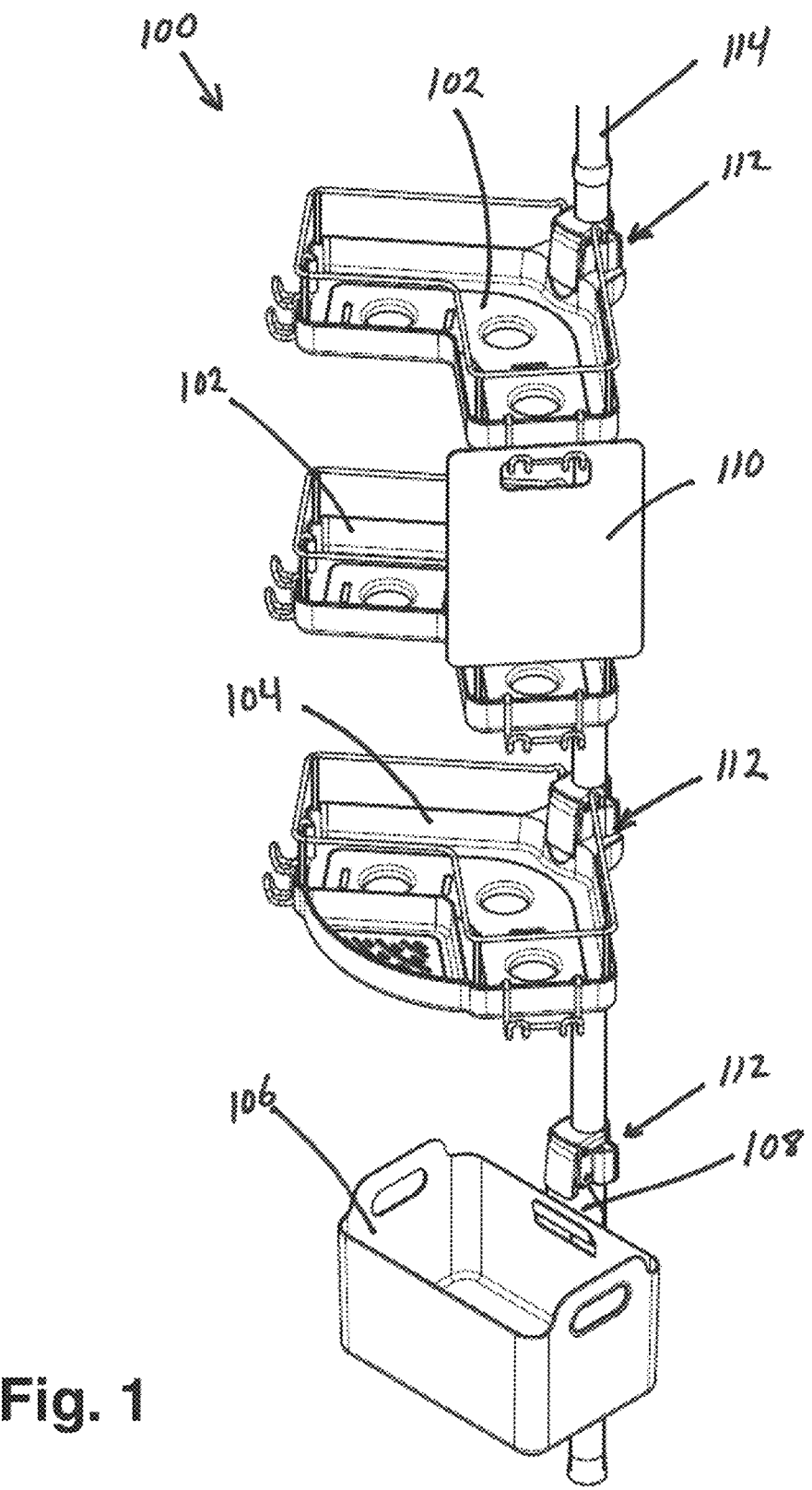
FIG. 1 illustrates an assembly of bins mounted on a vertical rail with bin lock securing devices according to an exemplary embodiment.

FIG. 1 illustrates a pole mounted organizer 100 for use in a bathroom or shower. The exemplary embodiment shows an organizer formed from a plurality of shelves 102 and 104, bins 106, hooks 108, and a mirror 110. Each of the shelves 102 and 104, bins 106, hook 108 and mirror comprise an accessory lock 112 at its interface with the pole 114.

Figure 2D:
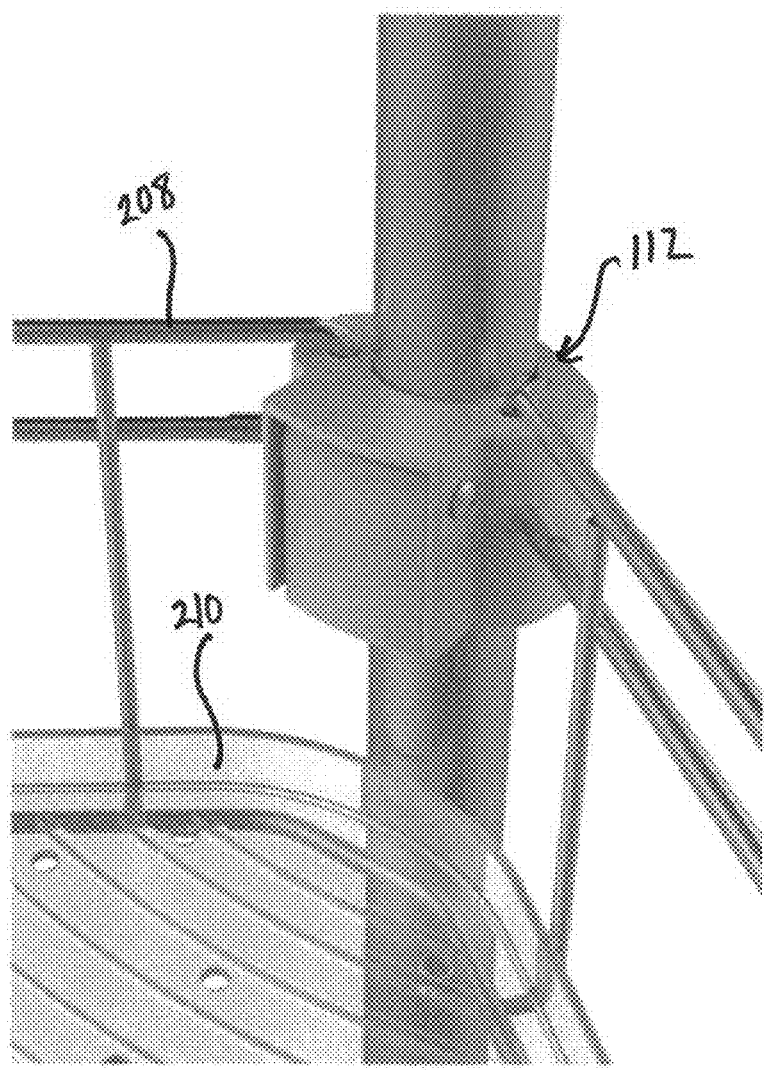

FIGS. 2a-2d illustrate the steps to mount an accessory lock 112 on a pipe or pole 114. As shown in FIG. 2a, the accessory lock 112 is formed from two main pieces, a cam bracket portion 202, and a cam clip portion 204 that when assembled, encircle the pipe or pole 114. As illustrated in FIG. 2a, the cam bracket portion 202, and cam clip portion 204 are engaged and slide together to surround the pole 114 without the need for tools. FIG. 2b shows the tab lock 206 in an unlatched position. As illustrated in FIG. 2c, the cam lever 206 is pressed down so that it is approximately flush with the side of the accessory lock. As will be described in more detail herein, the cam lever 206 engages with a tension plate which presses against the pole or pipe to secure the accessory lock in place. FIG. 2d shown the accessory lock 112 along with a partial view of a tray bracket 208 and a tray 210. As shown, the tray bracket 208 engages with openings 212 formed in the accessory lock 112. These openings are also visible in FIGS. 2b-2c.

Figure 3A:
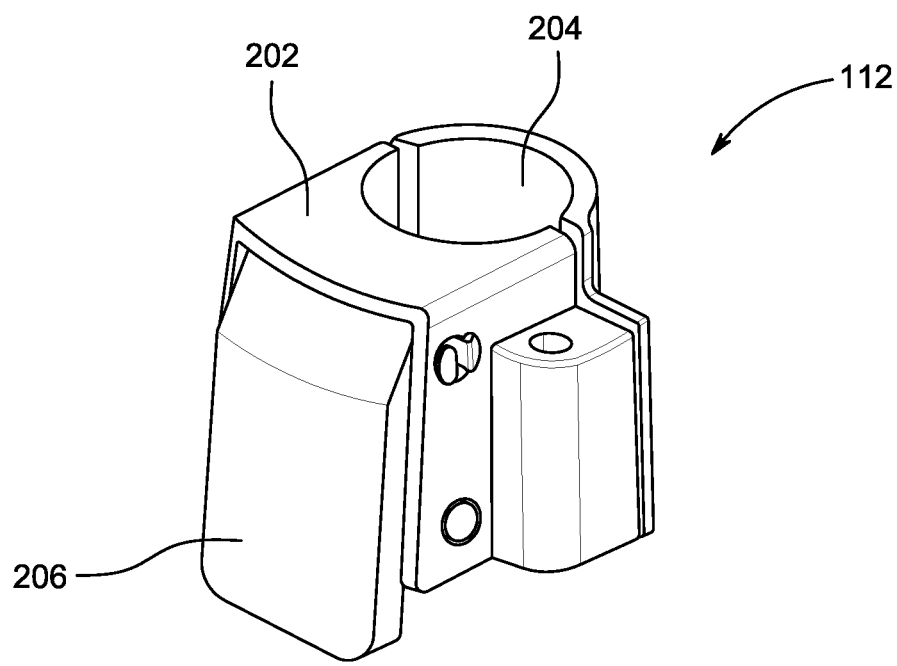
FIGS. 3a-3b illustrate perspective views of an accessory lock according to an exemplary embodiment.
Figure 3B:
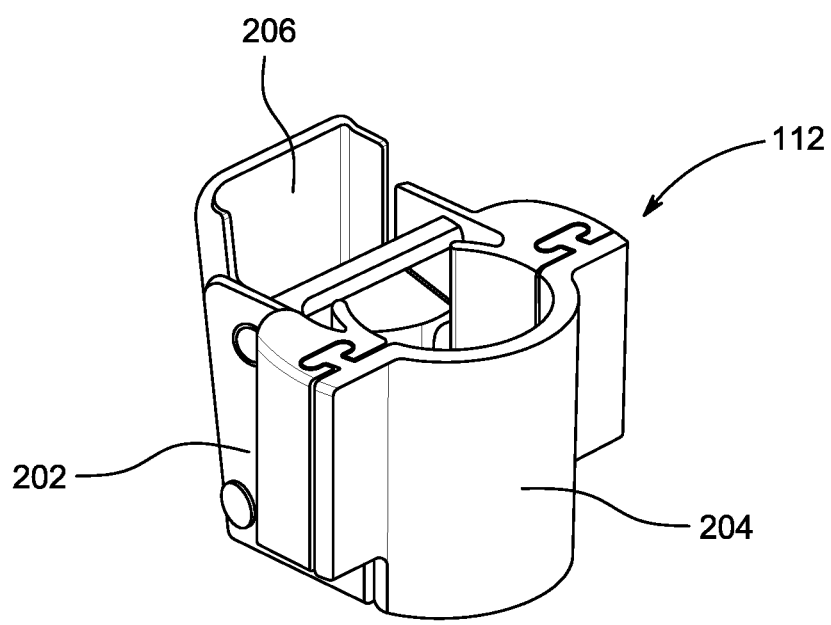

FIGS. 3a-3b illustrate a top and bottom perspective view of an exemplary embodiment of an accessory lock 112. Shown in the figure are the cam clip 204, cam bracket 202, and the cam lever 206 that serves to engage the pipe or pole (not shown).

Figure 4A:
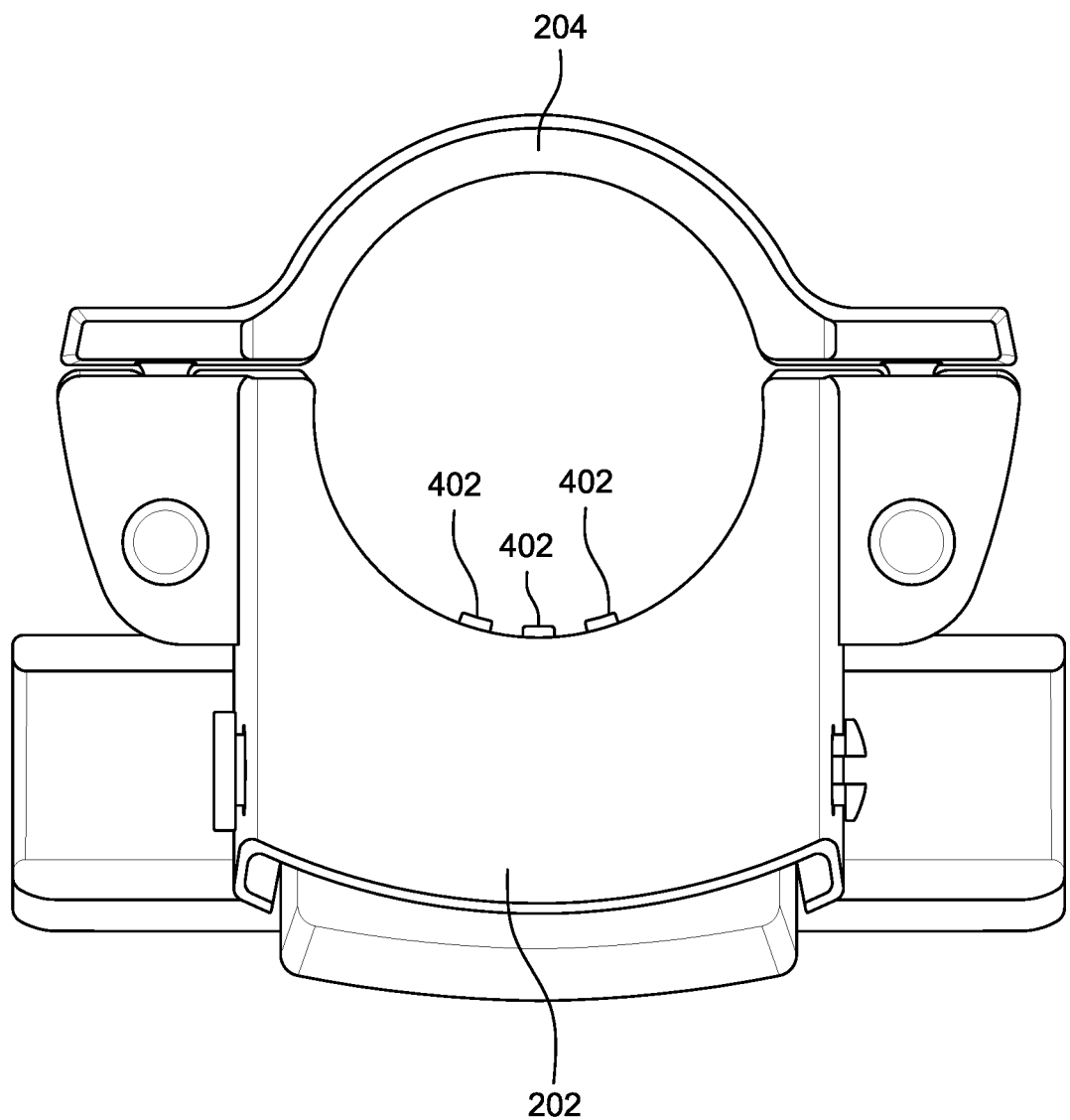
FIGS. 4a-4b illustrate top views of an exemplary embodiment.
Figure 4B:
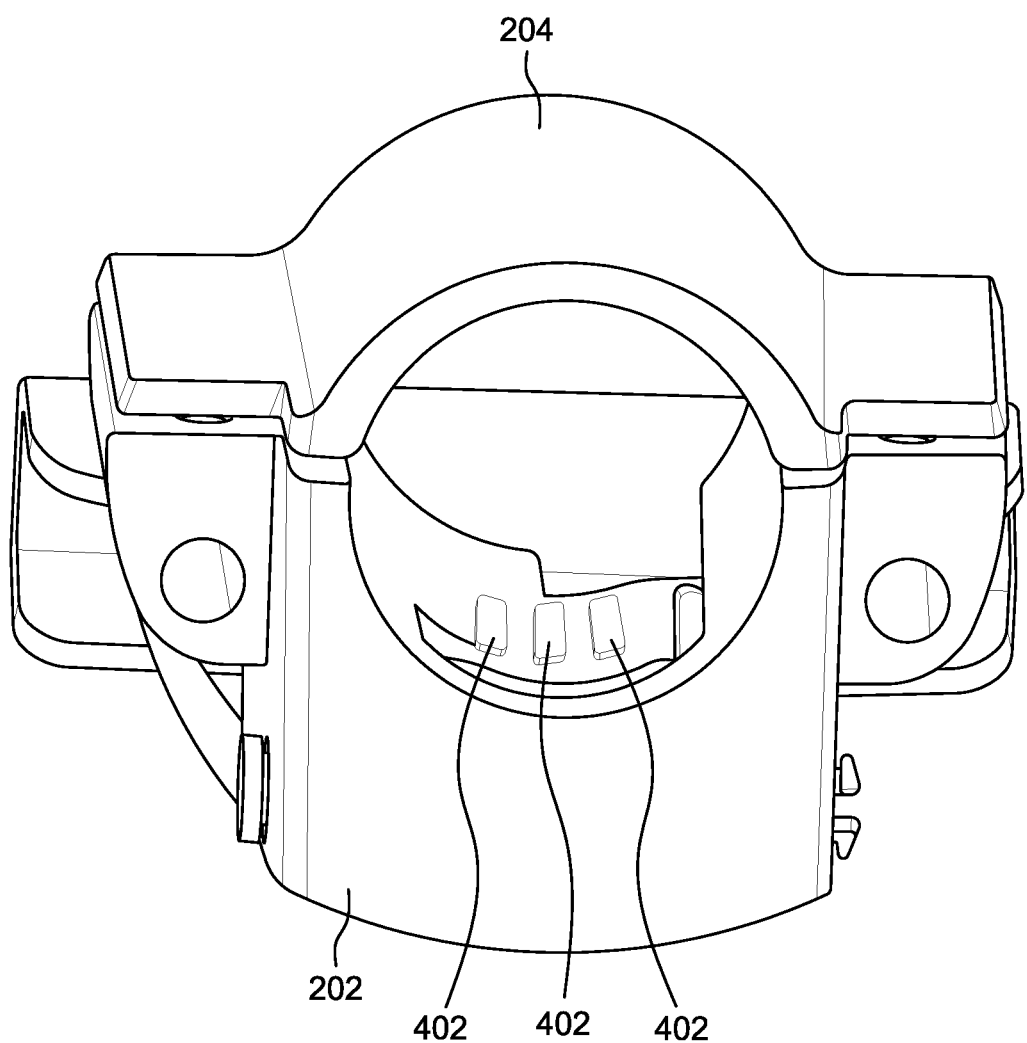

FIGS. 4a-4b illustrate a top plan view and top perspective view of another exemplary embodiment of an accessory lock 112. Visible in both FIGS. 4a and 4b are grip ridges 402 located in an opening formed between the cam bracket 202 and the cam clip 204 and that provide an improved grip between the pipe or pole and the accessory lock 112.

Figure 5A:
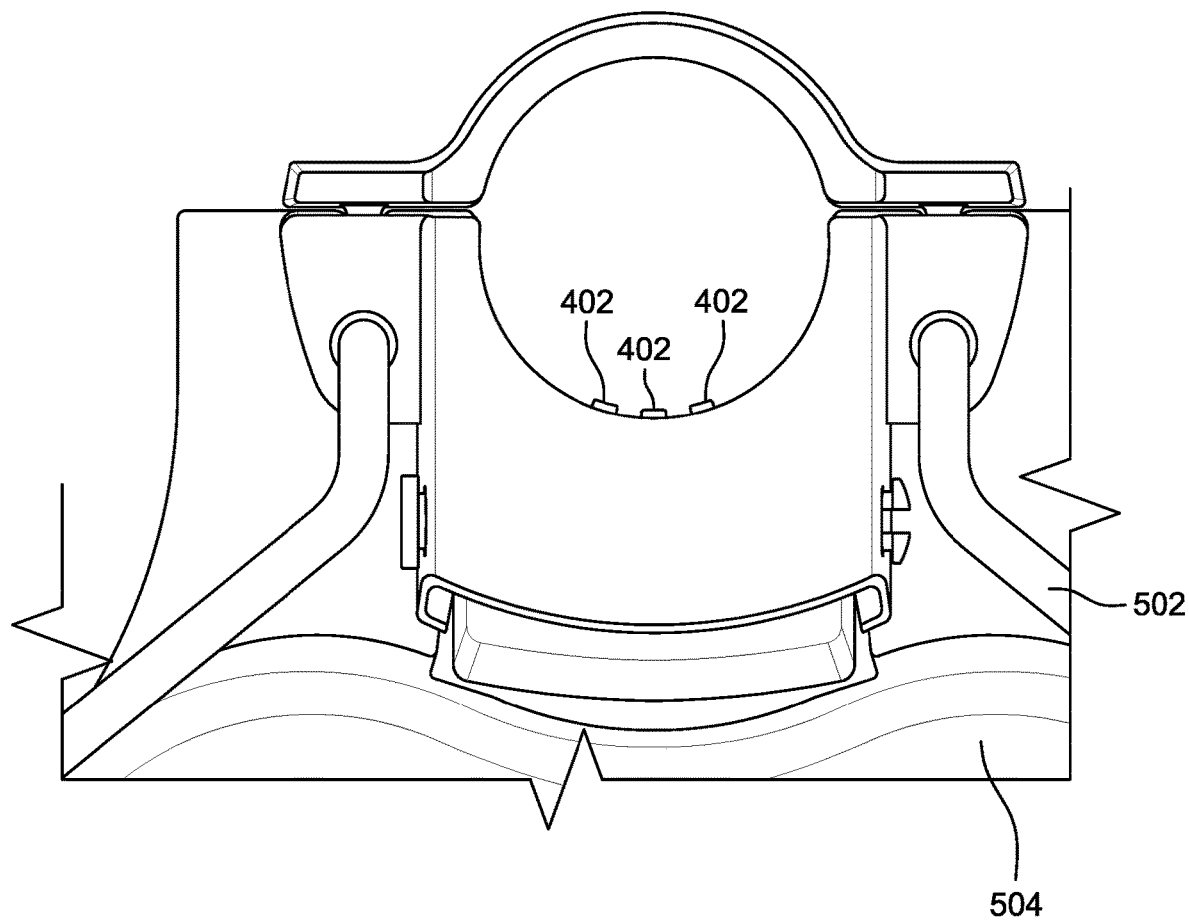
FIGS. 5a-5b illustrate top views of another exemplary embodiment including a wire retainer mounted to the accessory lock.
Figure 5B:
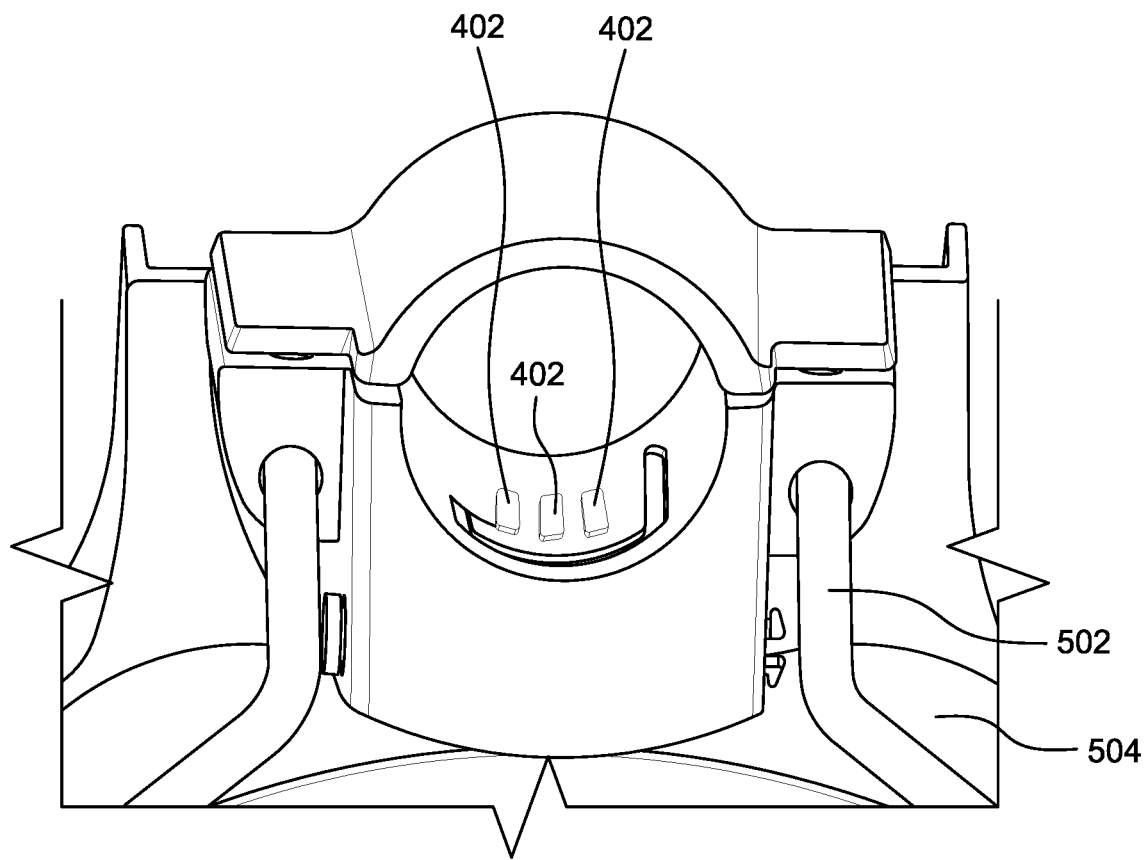

FIGS. 5a-5b illustrate a top plan view and top perspective view of another exemplary embodiment of an accessory lock 112. As with FIGS. 4a and 4b, grip ridges 402 located in an opening formed between the cam bracket 202 and the cam clip 2004 are visible. These ridges 402 provide an improved grip between the pipe or pole and the accessory lock 112. Also visible in FIGS. 5a-5b are a tray bracket 502 and partially visible tray 504 that is integral to the accessory lock 112 illustrated.

Figure 6A:
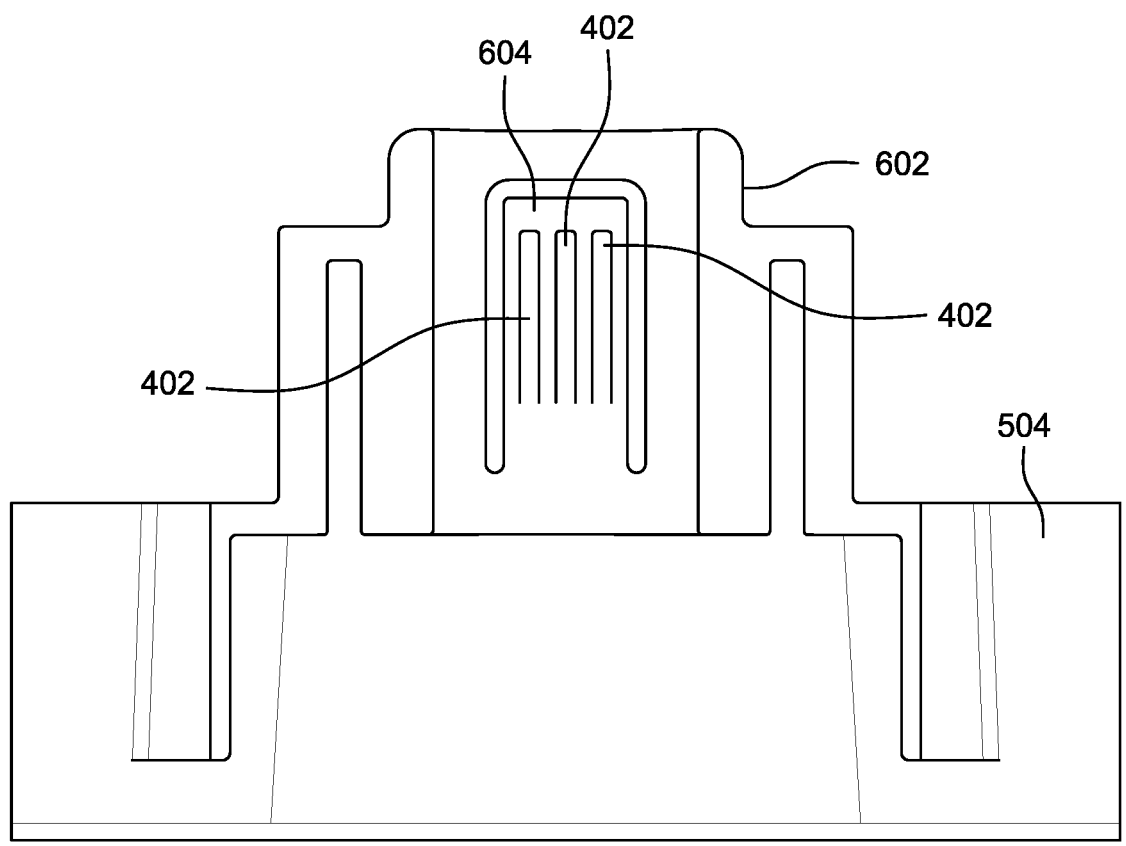
FIGS. 6a-6b illustrate side views of a partial bin lock according to an exemplary embodiment.
Figure 6B:
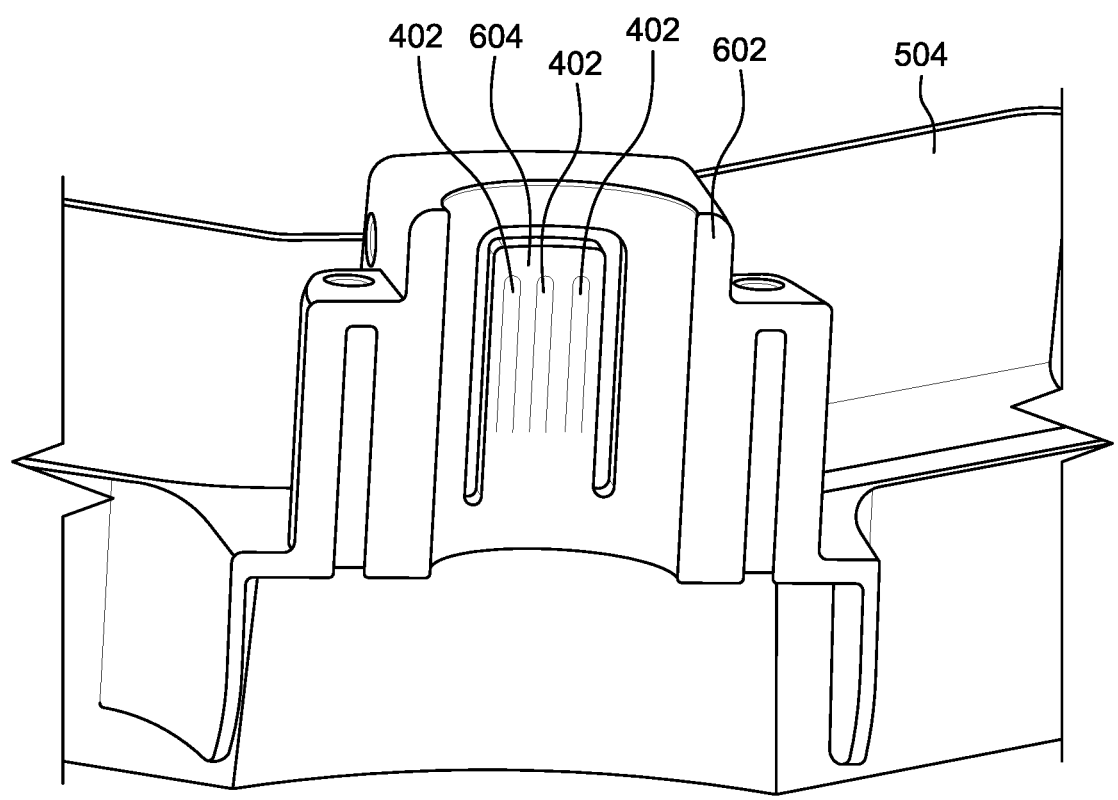

FIGS. 6a-6b illustrate a front plan view and perspective view of the cam bracket portion 602 of the accessory lock 112 of FIGS. 5a-5b. In the illustrated cam bracket 602, a tension plate 604 on which grip ridges 402 have been formed. The tension plate 604 flexes to make contact with a pipe or pole (not shown) to lock the accessory lock 112 in place. Also partially visible in the figures is the tray 504 portion of the exemplary embodiment.

Figure 7A:
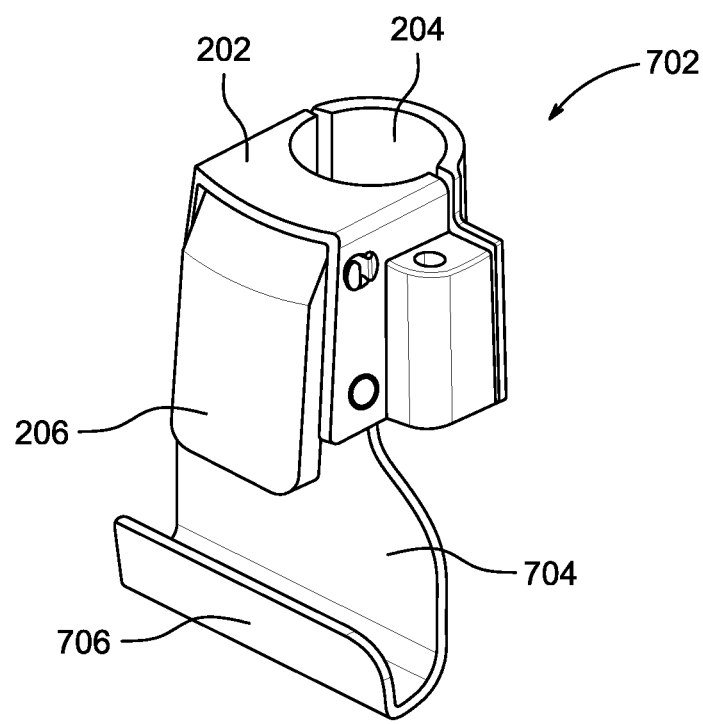
FIGS. 7a-7b illustrate perspective views of an accessory lock with an integral hook according to another exemplary embodiment.
Figure 7B:
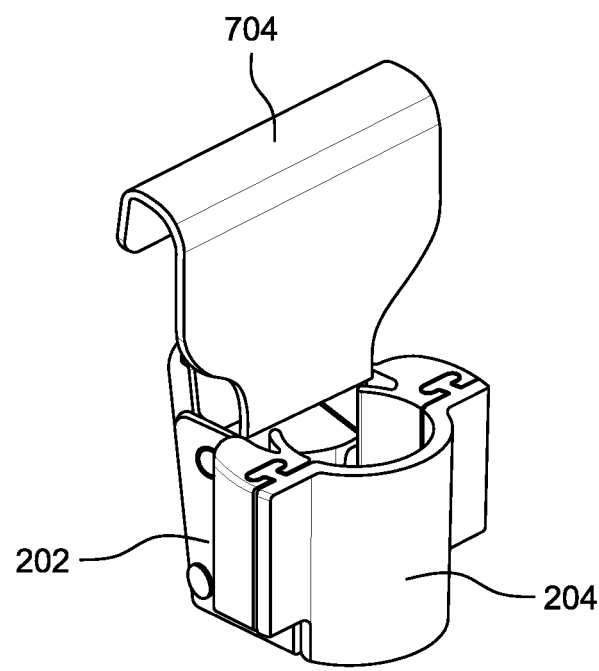

FIGS. 7a-7b illustrate a top and bottom perspective view of another exemplary embodiment of an accessory lock 702 in which a tension plate 704 is formed with an integral hook 706. Also visible in the figures are the cam clip 204, cam bracket 202, and the cam lever 206. As was described in FIGS. 2a-2c, the cam lever 206 is pressed down against the cam bracket 202, whereupon a cam-shaped portion of the cam lever 206 presses against the tension plate 704 which presses against the wall of a pole or pipe to secure the accessory lock 702 in place. As shown in FIG. 1, a bin or other object can hang from the hook to removably hold the bin.

Figure 8:
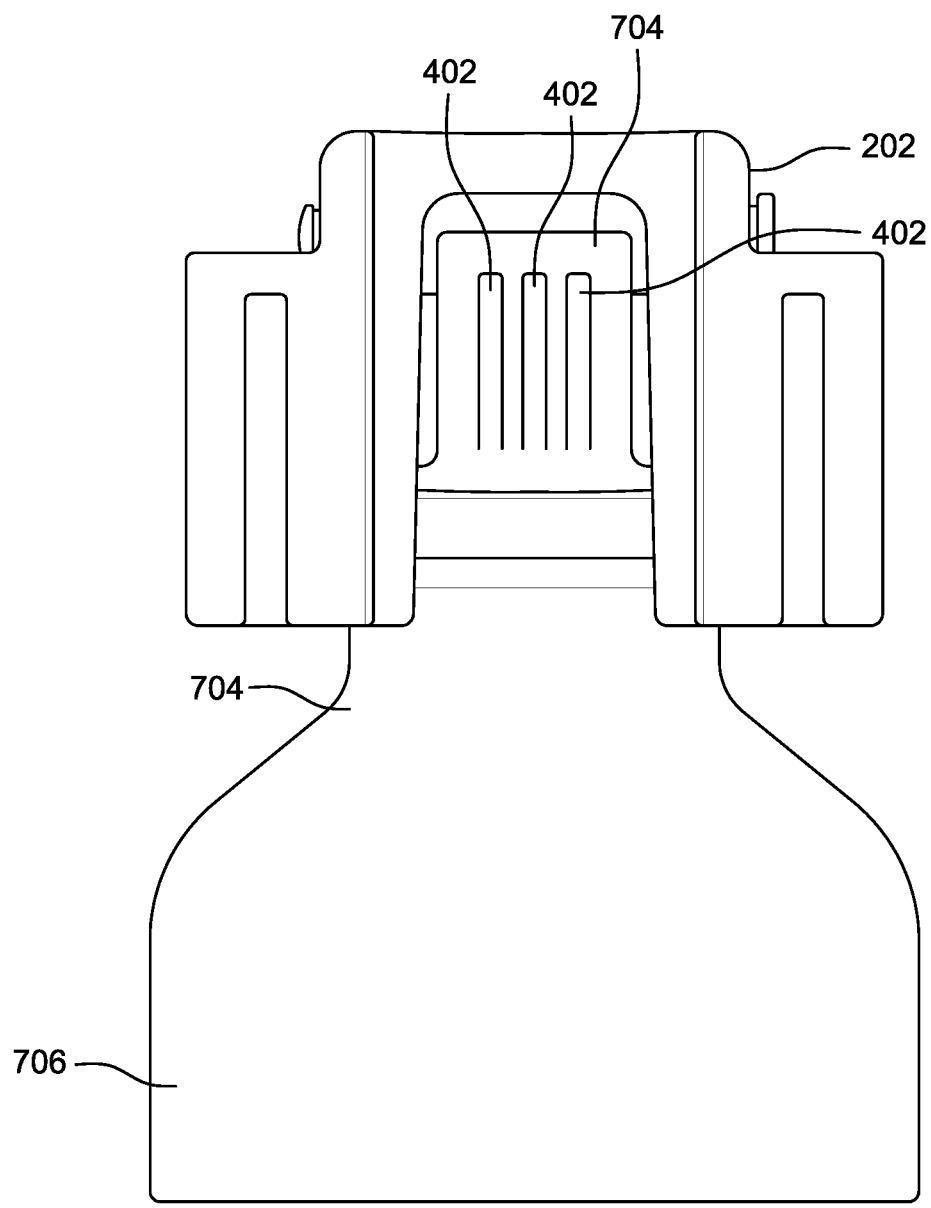
FIG. 8 illustrates a side view of a partial bin lock with an integral hook according to an exemplary embodiment.

FIG. 8 illustrates a front view of a cam bracket 202 used in the accessory lock 702 of FIGS. 7a-7b. The figure shows the tension plate 704 and integral hook 706 installed in the cam bracket 20. Also visible are grip ridges 402 on an arcuate surface of the tension plate.

Figure 9A:
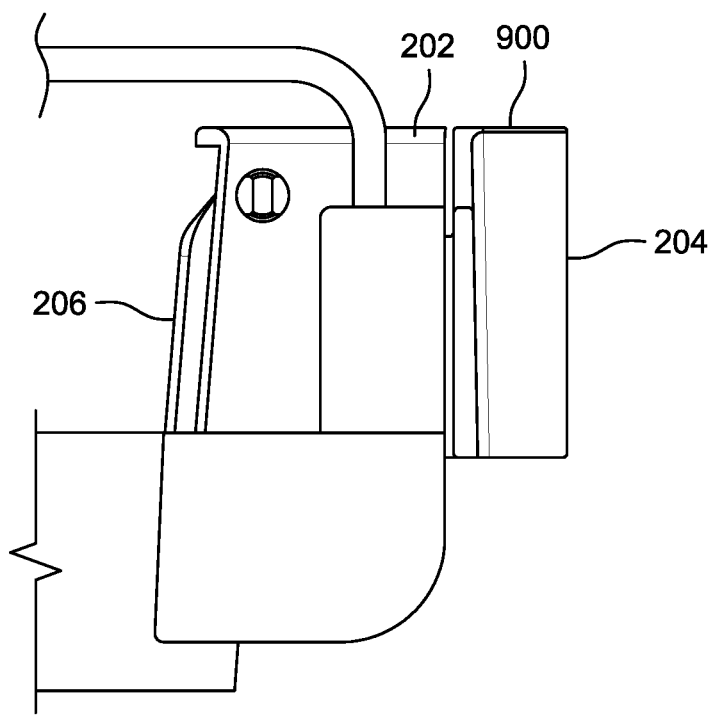
FIG. 9a illustrates a side view of an accessory lock according an exemplary embodiment.
Figure 9B:
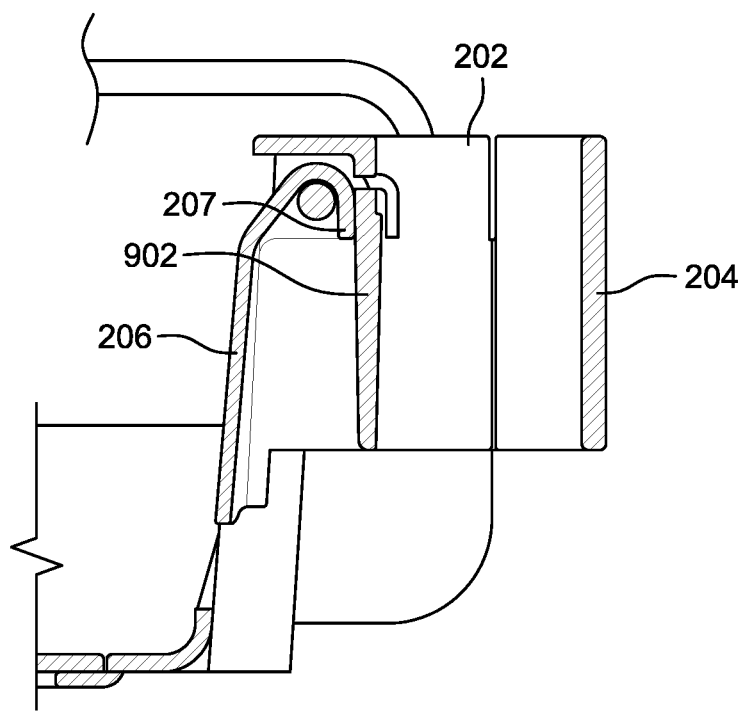

FIGS. 9a-9b illustrate a side view of an accessory lock 900 in FIG. 9a and a cutaway view of the accessory lock 900 of FIG. 9a in FIG. 9b. Shown is the cam lever 206 with a cam shape 207 providing tension against the tension plate 902. This causes the tension plate 902 to protrude into the opening formed between the cam bracket 202 and the cam clip 204 to provide tension against a pipe or pole (not shown).

Figure 10A:
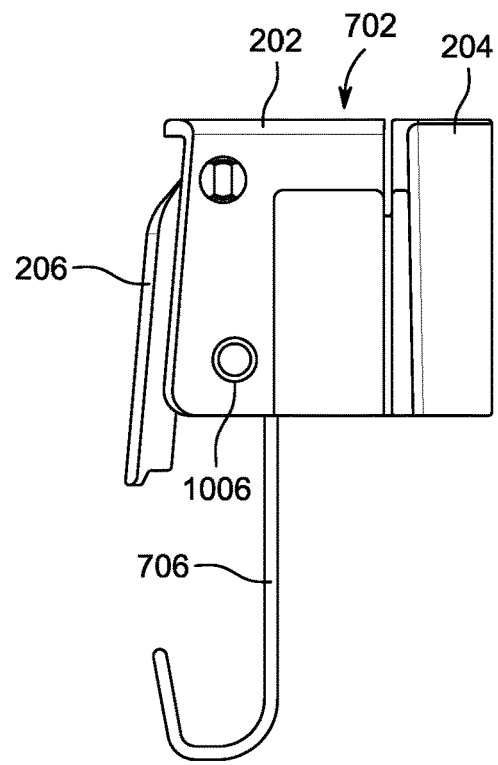
FIG. 10a illustrates a side view of an accessory lock according another exemplary embodiment.
Figure 10B:
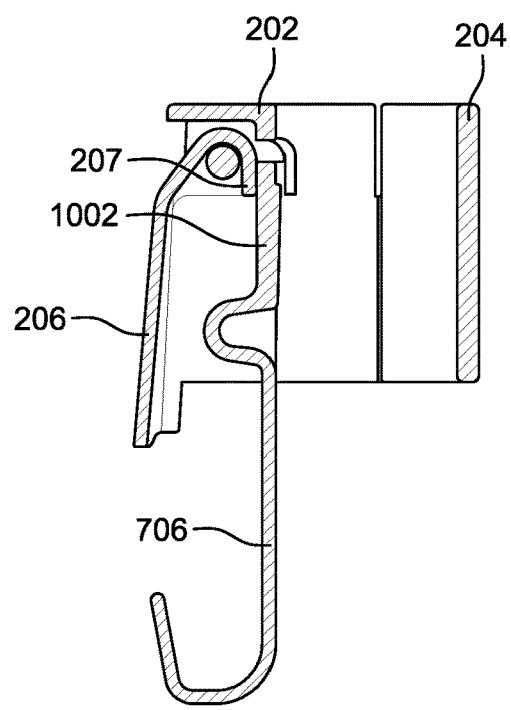
Figure 10C:
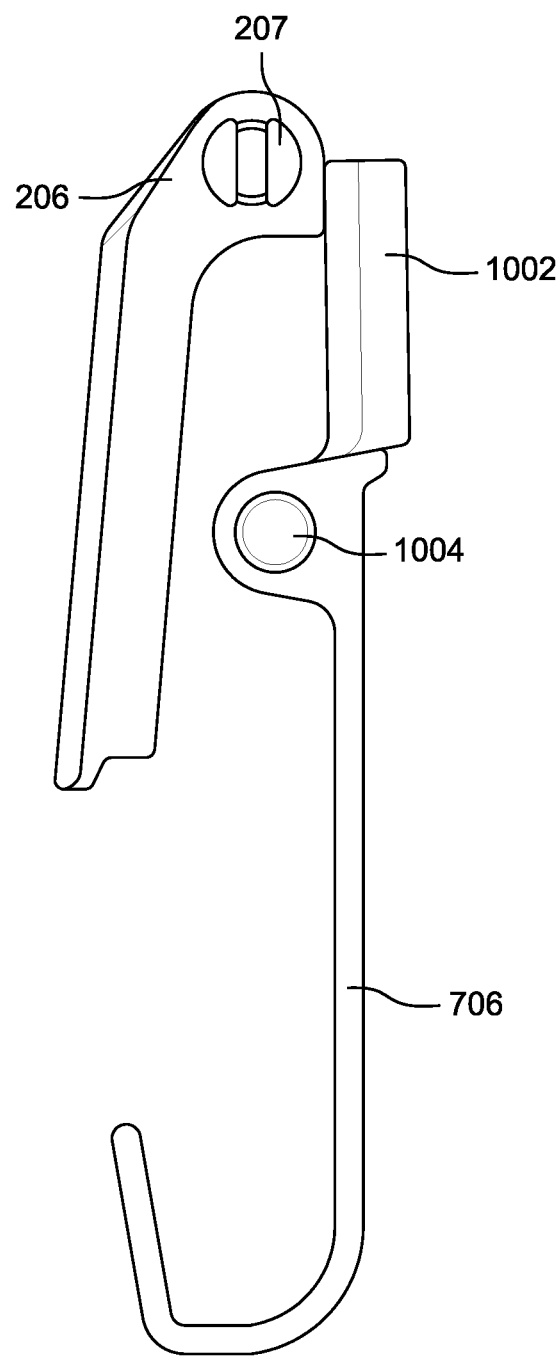
FIG. 10c illustrates the cam and locking tab portion of FIGS. 10a-10b.

FIGS. 10a-10c illustrate a side view of the accessory lock 702 of FIGS. 7a-7b. As with FIGS. 9a and 9b, the cutaway view of FIG. 10b shows the tension plate 1002 being pressed inwardly by the cam lever 206. as the cam lever 206 is rotated into the position illustrated in the figures. FIG. 10c illustrates a rendering of the cam lever 206 and tension plate 1002 to better illustrate the interaction between the two components. The cam shape 207 of the cam lever 206 is clearly visible in FIG. 10c. In the illustrated embodiment, the tension plate 1002 is formed by an upper portion of the integral hook 706. FIG. 10c clearly shows a pivot recess 1004 formed in the integral hook 706 that engages with protrusion 1006 formed in the cam clip 204.

Figure 11A:
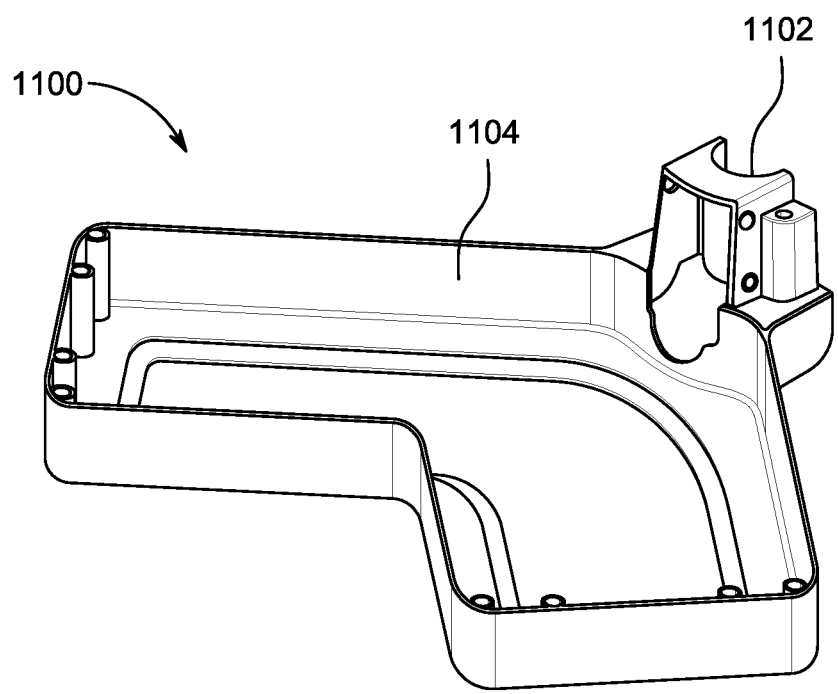
FIGS. 11a-11b illustrate top and bottom perspective views of an accessory lock with an integral shelf frame according to an exemplary embodiment.
Figure 11B:
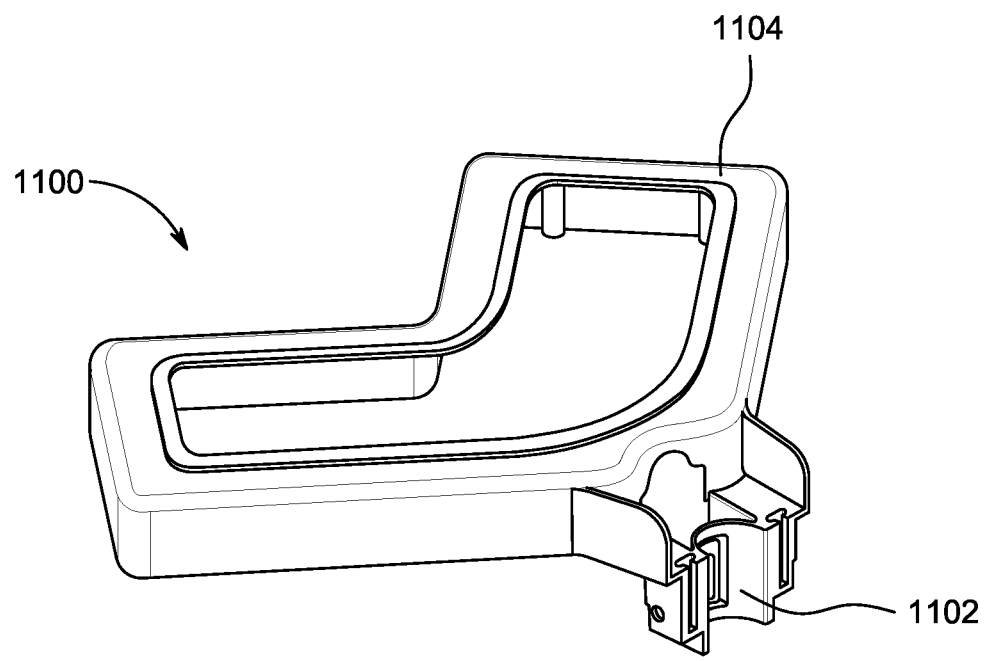
Figure 12A:
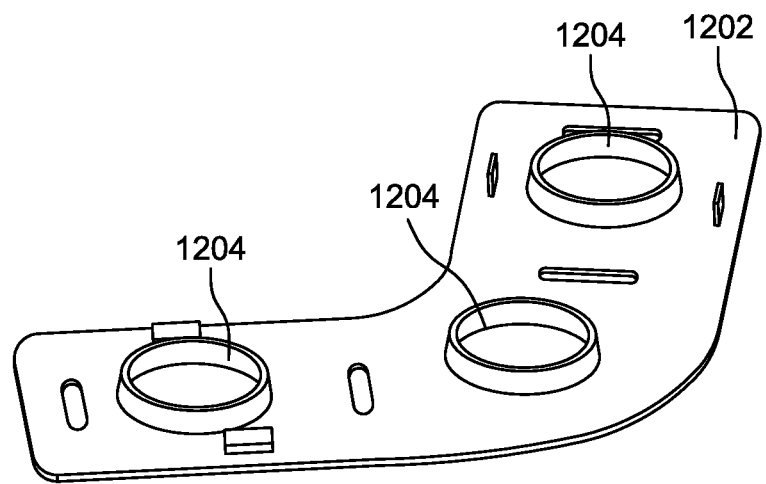
FIGS. 12a-12b illustrate a shelf insert for use with the accessory lock of FIGS. 11a-11b according to an exemplary embodiment.
Figure 12B:
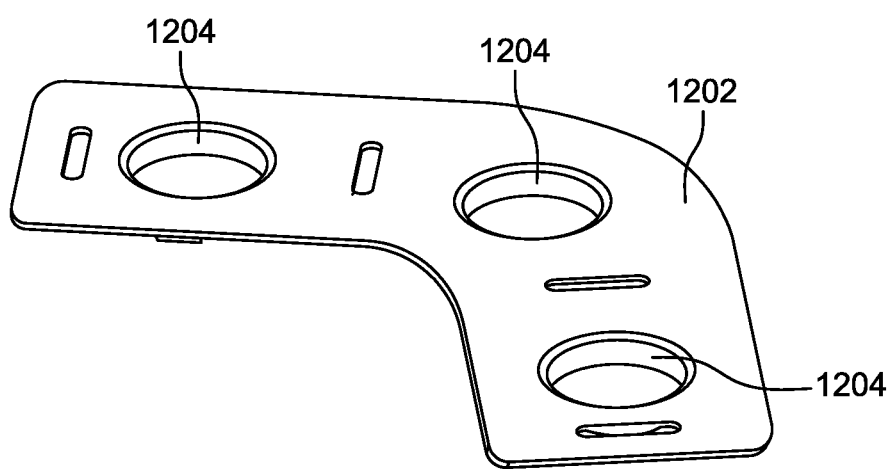

FIGS. 11a-11b illustrate the cam bracket 1102 portion of an exemplary embodiment of a cam bracket which is formed to include a frame portion 1104 of a storage tray. FIGS. 12a-12b illustrate a storage tray floor 1202 for use in the cam bracket of FIGS. 11a and 11b. As shown, there are various openings 1204 in the tray floor 1202. In certain exemplary embodiments, the tray floor 1202 may have different configurations of openings or no openings depending on the intended use.

Figure 13A:
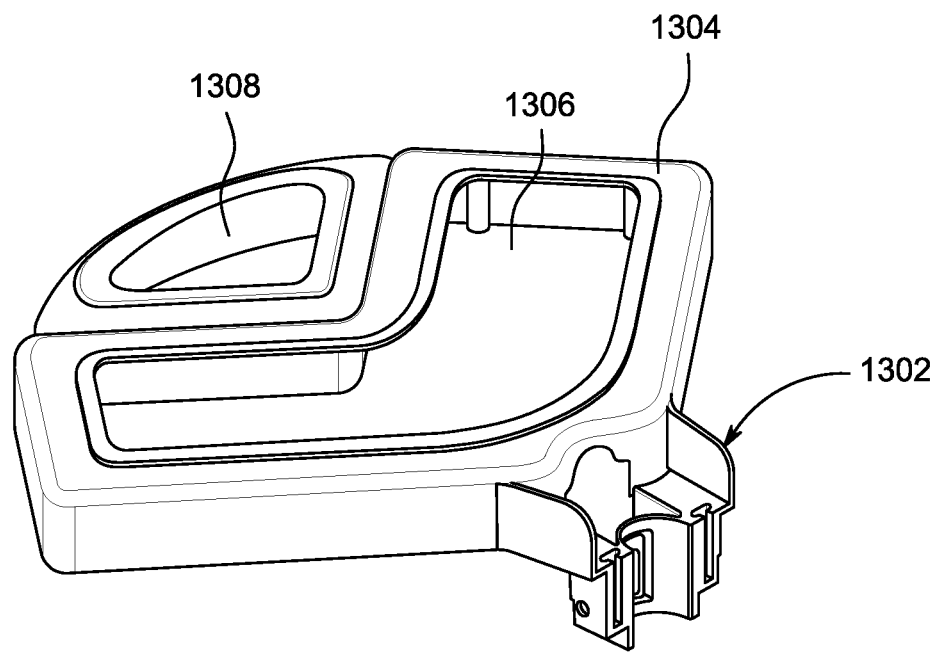
FIGS. 13a-13b illustrate a top and bottom perspective views of an accessory lock with an integral shelf frame according to another exemplary embodiment.
Figure 13B:
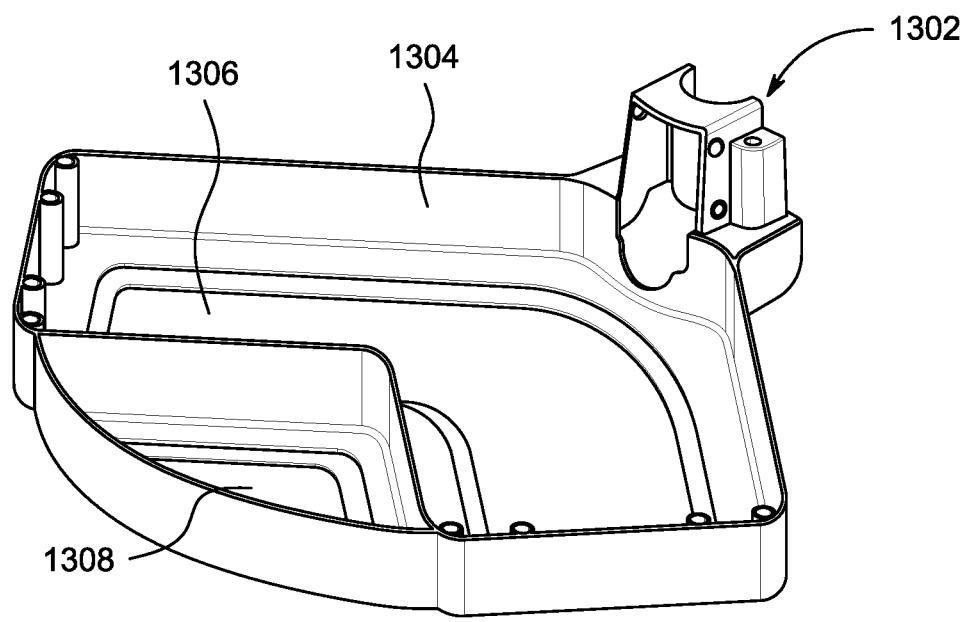
Figure 14A:
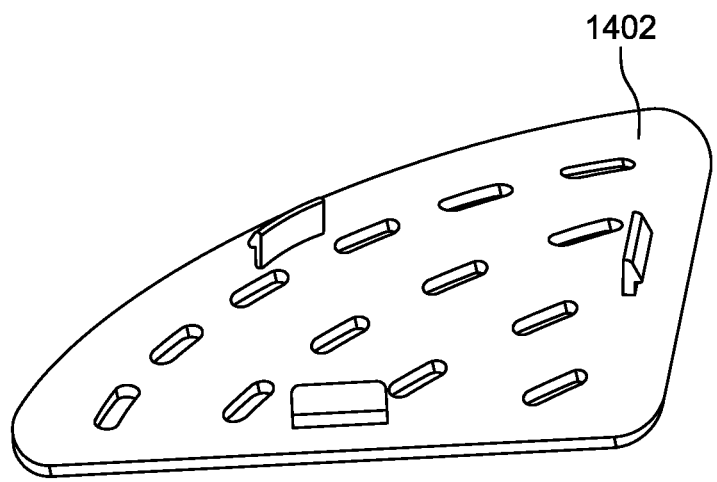
FIGS. 14a-14b illustrate a shelf insert for use with the accessory lock of FIGS. 13a-13b according to an exemplary embodiment.
Figure 14B:
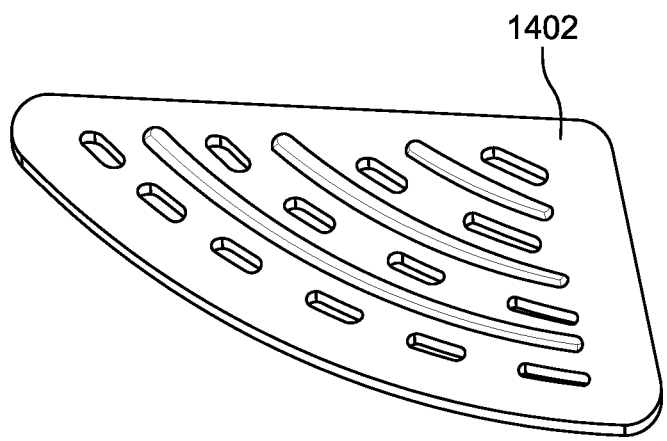

FIGS. 13a-13b illustrate a cam bracket portion 1302 of another exemplary embodiment of an accessory lock which is formed to include a frame portion 1304 of a storage tray 1306 and a soap tray 1308. FIGS. 14a-14b illustrate a bottom and top view of a soap tray floor 1402 for use in the cam bracket 1302 of FIGS. 13a-13b.

Figure 15:
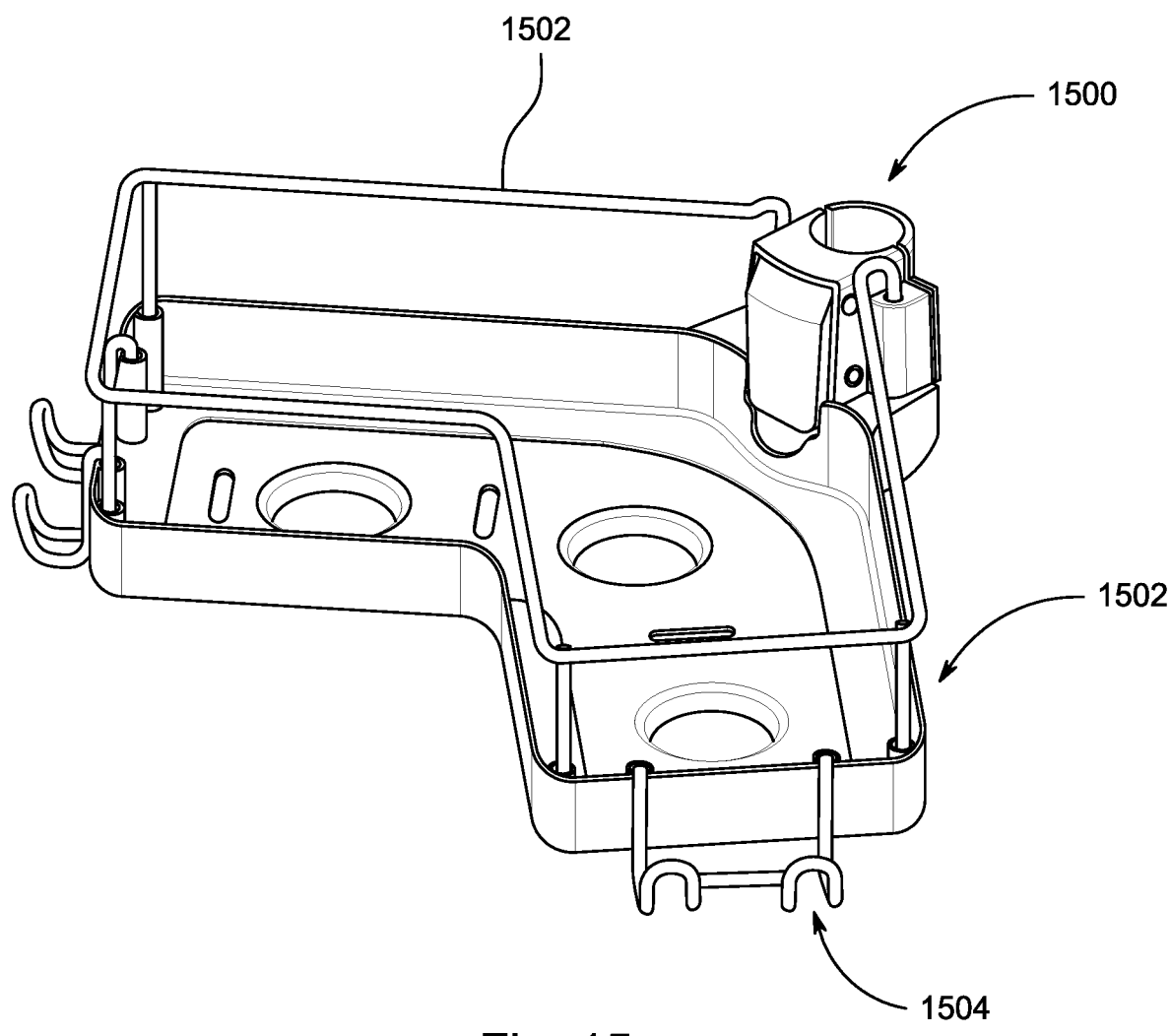
FIG. 15 illustrates a shelf with an integral bin lock according to an exemplary embodiment.

FIG. 15 illustrates an exemplary embodiment of an accessory lock 1500 with an integral storage tray 1502 formed from the cam bracket 1102 of FIGS. 11a-11b and the tray floor 1202 of FIGS. 12a-12b. The accessory lock 1500 comprises the frame portion 1104, a wire fence 1502, accessory hooks 1504, the tray floor 1202 being formed with various openings 1204.

Figure 16A:
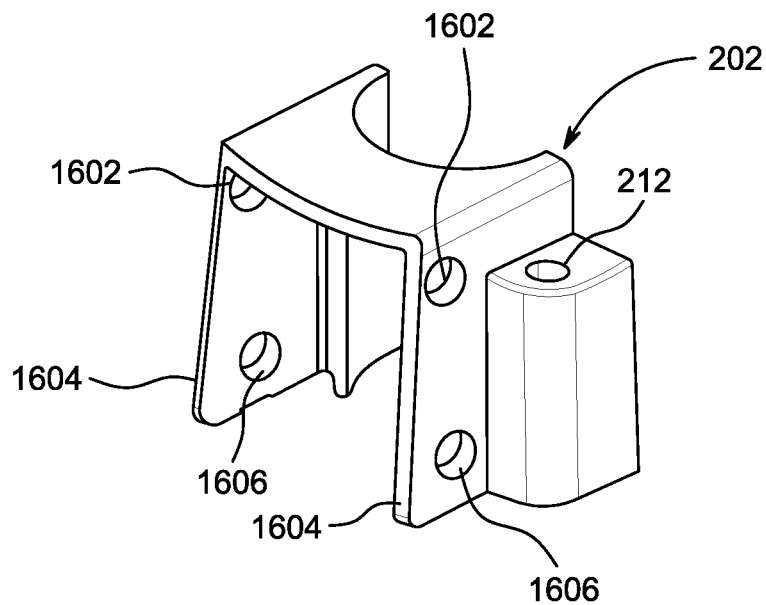
FIGS. 16a-16b illustrate a component used in an accessory lock according to an exemplary embodiment.
Figure 16B:
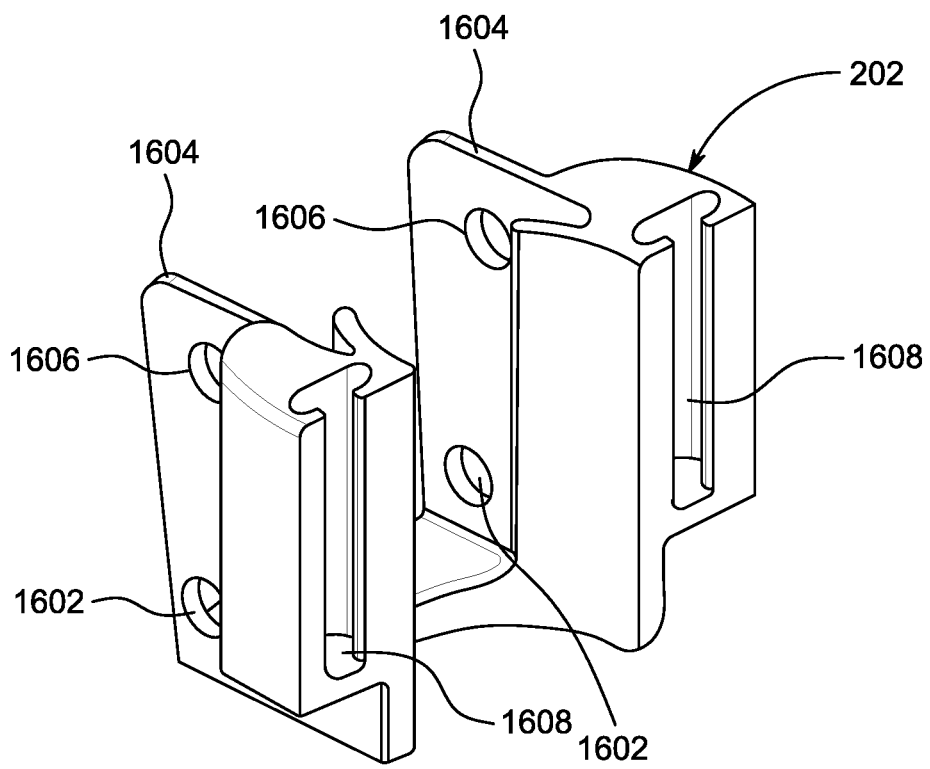
Figure 17A:
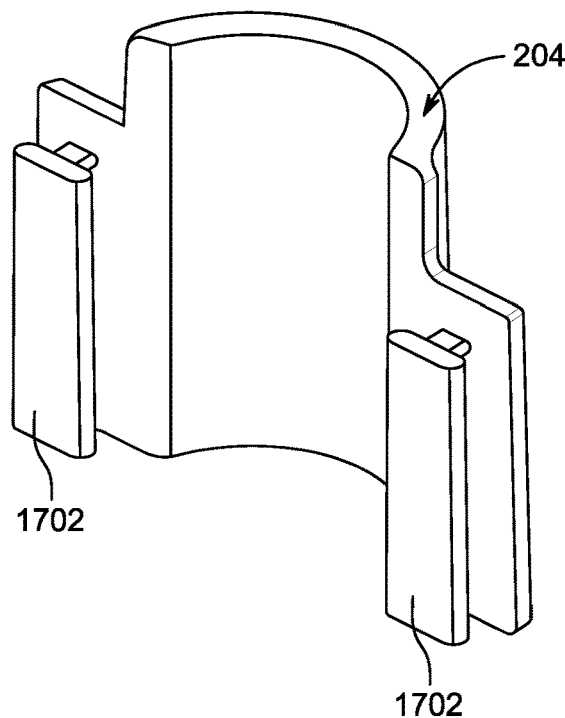
FIGS. 17a-17b illustrate another component used in an accessory lock according to an exemplary embodiment.
Figure 17B:
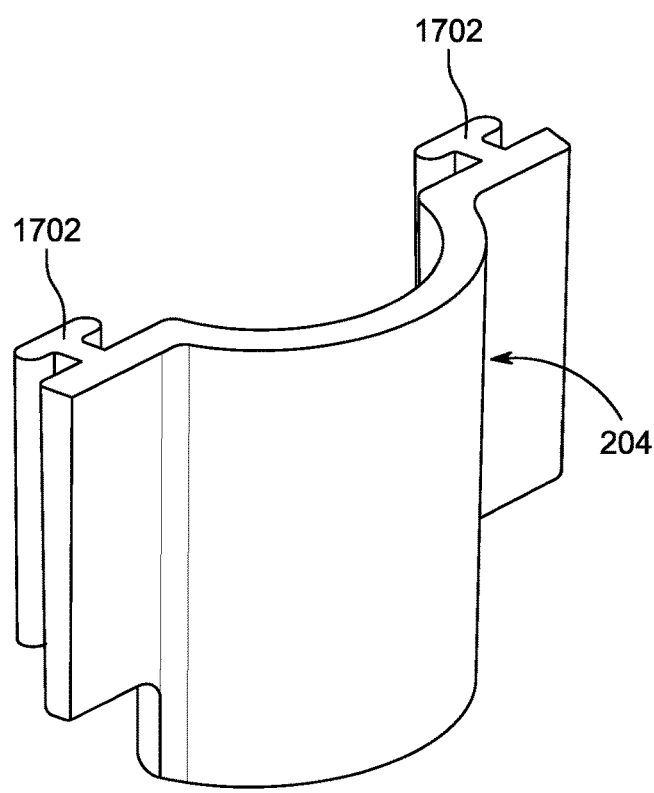

FIGS. 16a-16b illustrate the cam bracket portion 202 of an exemplary embodiment of an accessory lock 112. Shown are openings 1602 formed in latch ribs 1604 that receive a pivot pin (not illustrated) to secure the cam lever 206 to the cam bracket 202. Openings 1606 are also formed in the latch ribs 1604 for securing the tension plate (not shown) to the cam bracket 202 such that the tension plate can rotate inward to press against a pole or pipe. Visible in the front view (FIG. 16a) is one of the openings 212 for receiving posts formed in a shelf or other attachment. Visible in the rear view (FIG. 19b) are slots 1608 which receive mating tabs 1702 formed in a cam clip 204. FIGS. 17a-17b illustrate the cam clip 204 portion of an exemplary embodiment of an accessory lock 112. Visible are mating tabs 1702 formed in the cam clip that mate with the slots 1608 of the cam bracket.

Figure 18A:
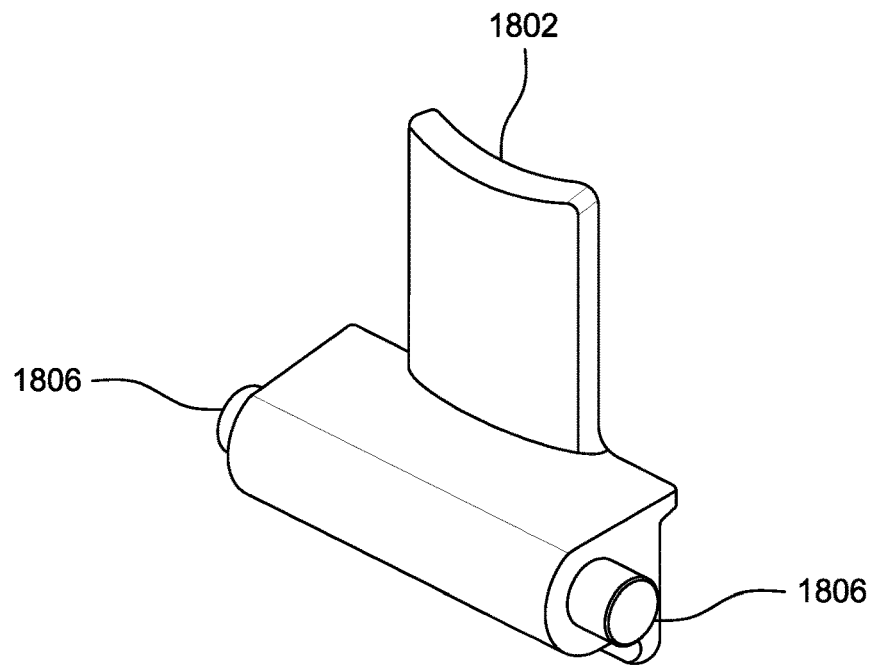
FIGS. 18a-18b illustrate another component used in an accessory lock according to an exemplary embodiment.
Figure 18B:
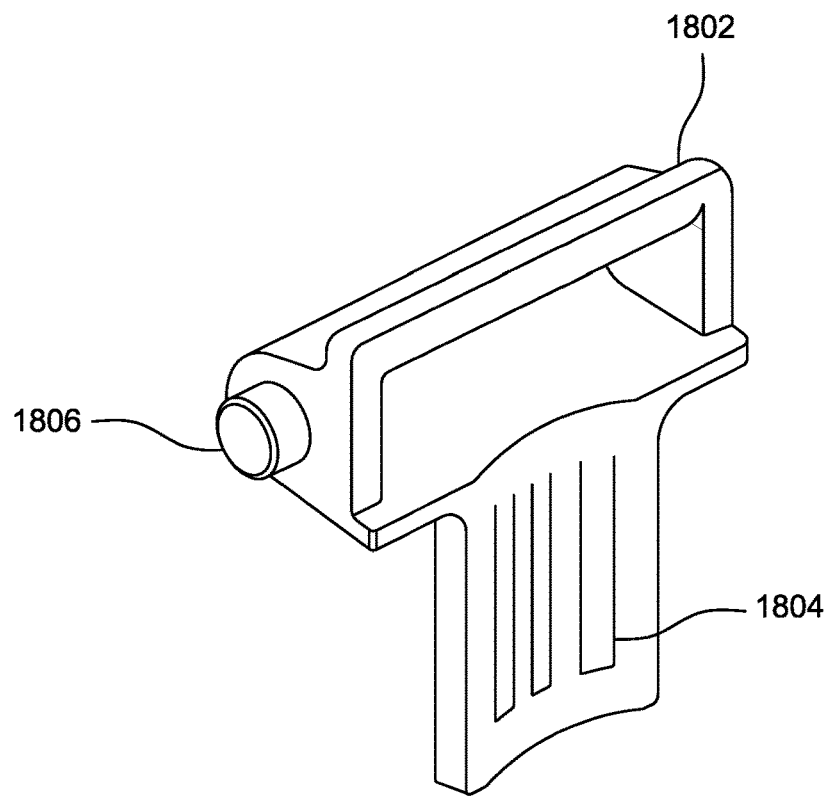
Figure 19A:
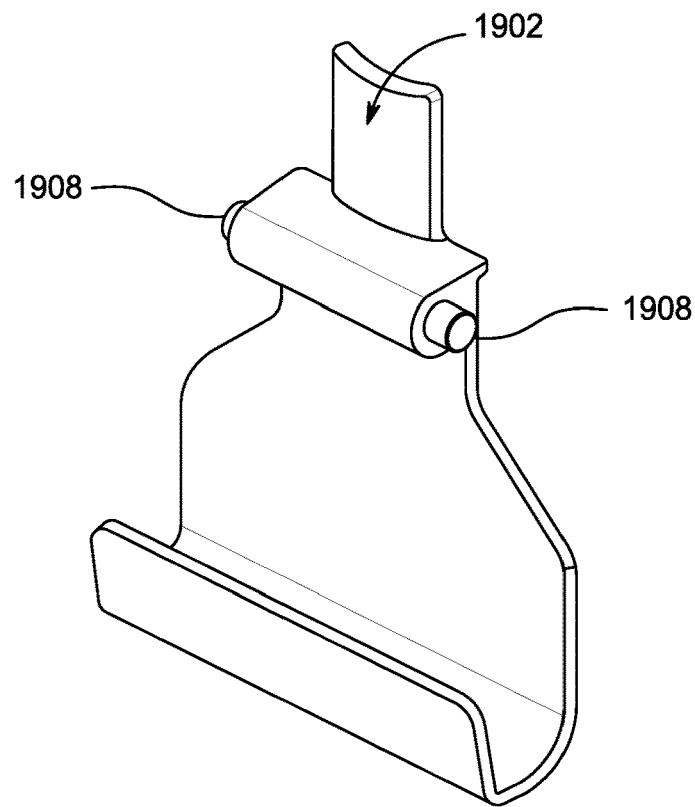
FIGS. 19a-19b illustrate an alternate embodiment of the component of FIGS. 18a-18b.
Figure 19B:
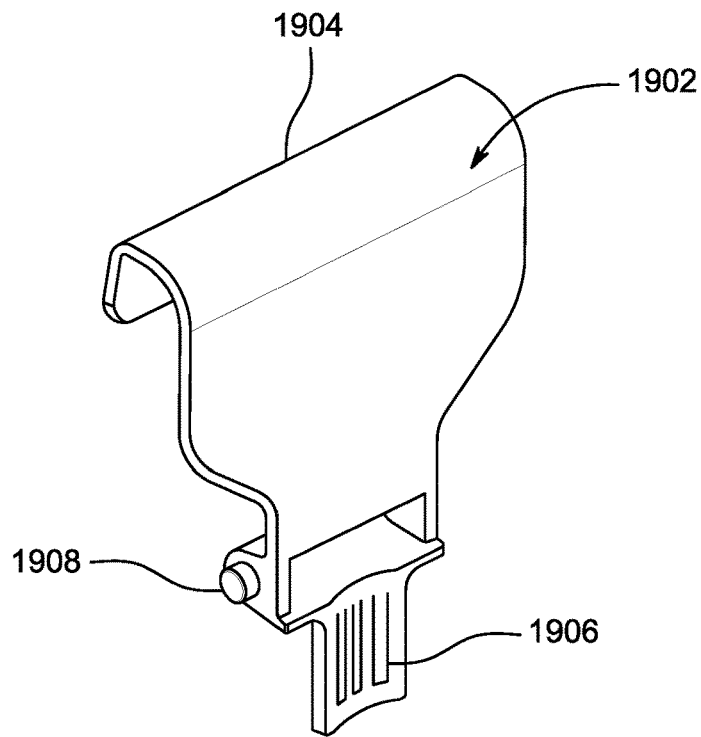

FIGS. 18a-18b illustrate the tension plate portion 1802 of an exemplary embodiment of an accessory lock. Illustrated in FIG. 18b is the arcuate surface 1804 which makes contact with the pole or pipe to secure the accessory lock. Also illustrated in both FIGS. 22a and 22b are pins 1806 which are captured by holes 1606 formed in the latch ribs 1604 of the cam bracket 202 as described in the discussion of FIGS. 16a-16b. FIGS. 19a-19b illustrate a tension plate portion 1902 comprising a hook 1904 for use in another exemplary embodiment of an accessory lock. This tension plate 1902 comprises an arcuate surface 1906 and pins 1908 configured similarly to the tension plate 1802 of FIGS. 18a-18b.

Figure 20A:
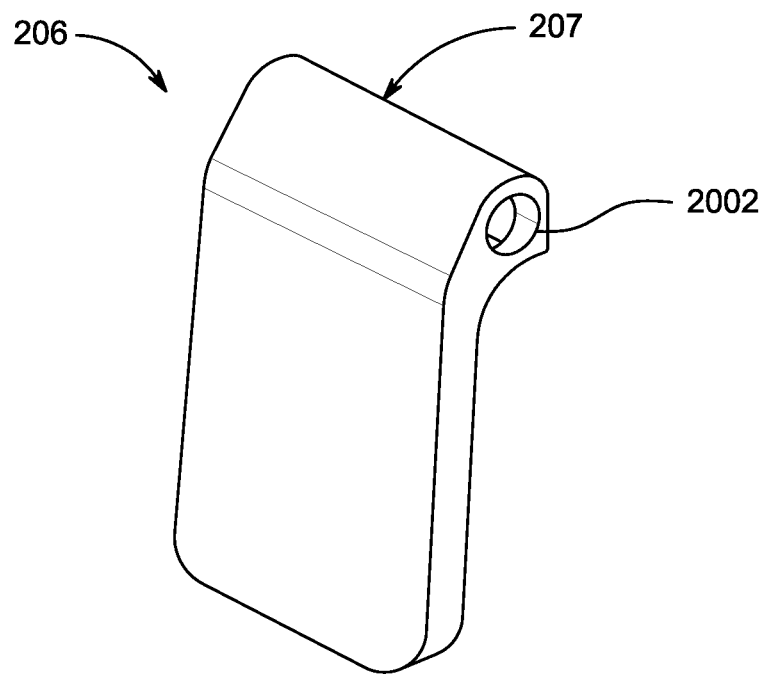
FIGS. 20a-20b illustrate a cam lever component used in an accessory lock according to an exemplary embodiment.
Figure 20B:
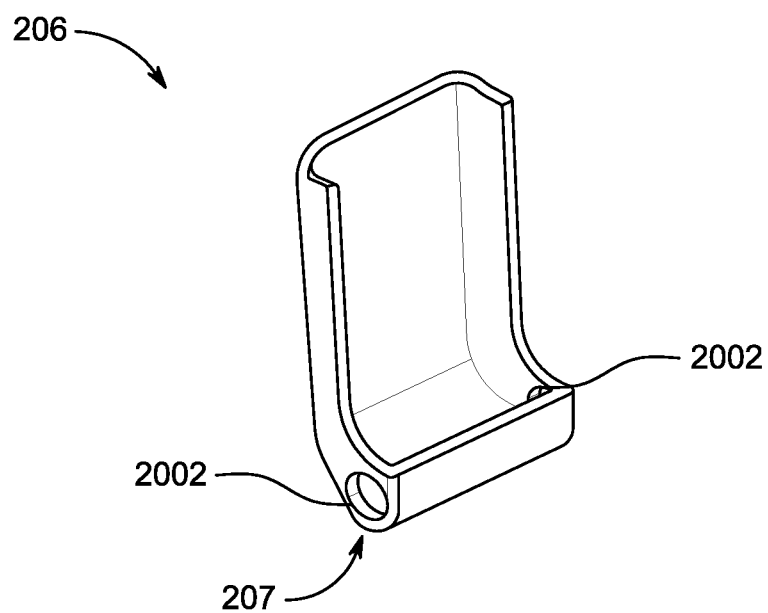
Figure 21A:
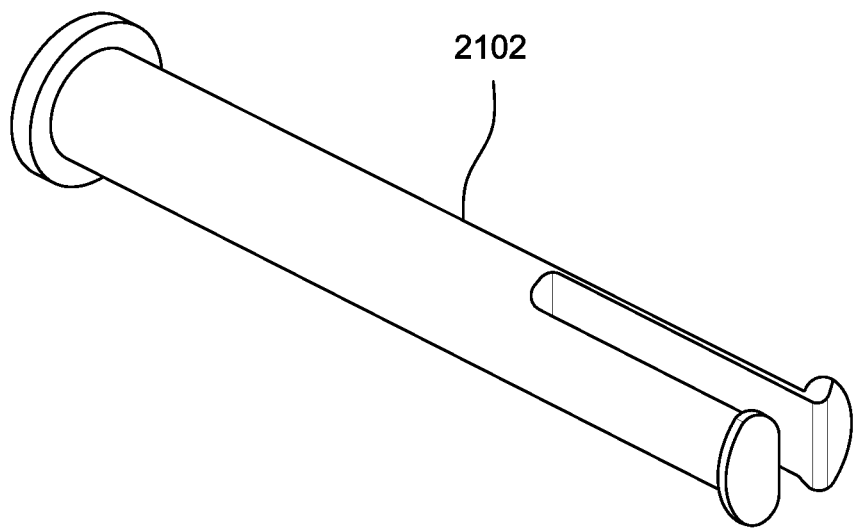
FIGS. 21a-21b illustrate a pivot pin used in an accessory lock according to an exemplary embodiment.
Figure 21B:
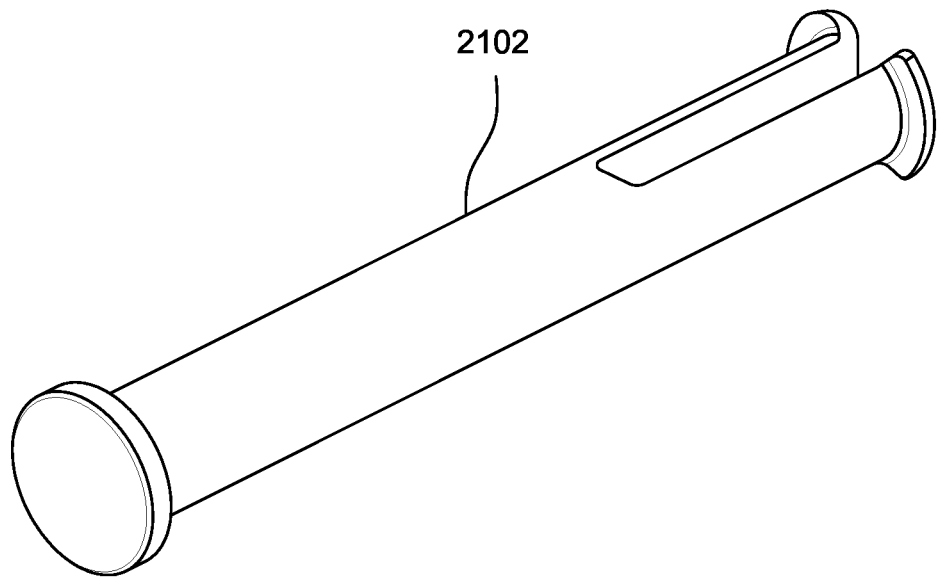

FIGS. 20a-20b illustrate the cam lever 206 of an exemplary embodiment of an accessory lock. Illustrated in FIGS. 20a-20b is a cam shape 207 that presses against the tension plate to secure the accessory lock to the pole or pipe. Also illustrated in both FIGS. 20a and 20b are holes 2002 which allow a pin (not shown) to secure the cam lever 206 to holes 1602 in the latch ribs 1604 of the cam bracket 202 as described in the discussion of FIGS. 16a-16b. FIGS. 21a-21b illustrate a pin 2102 used to secure the cam lever 206 of FIGS. 20a-20b to the cam bracket portion 1604 of a cam bracket 202.

Figure 22:
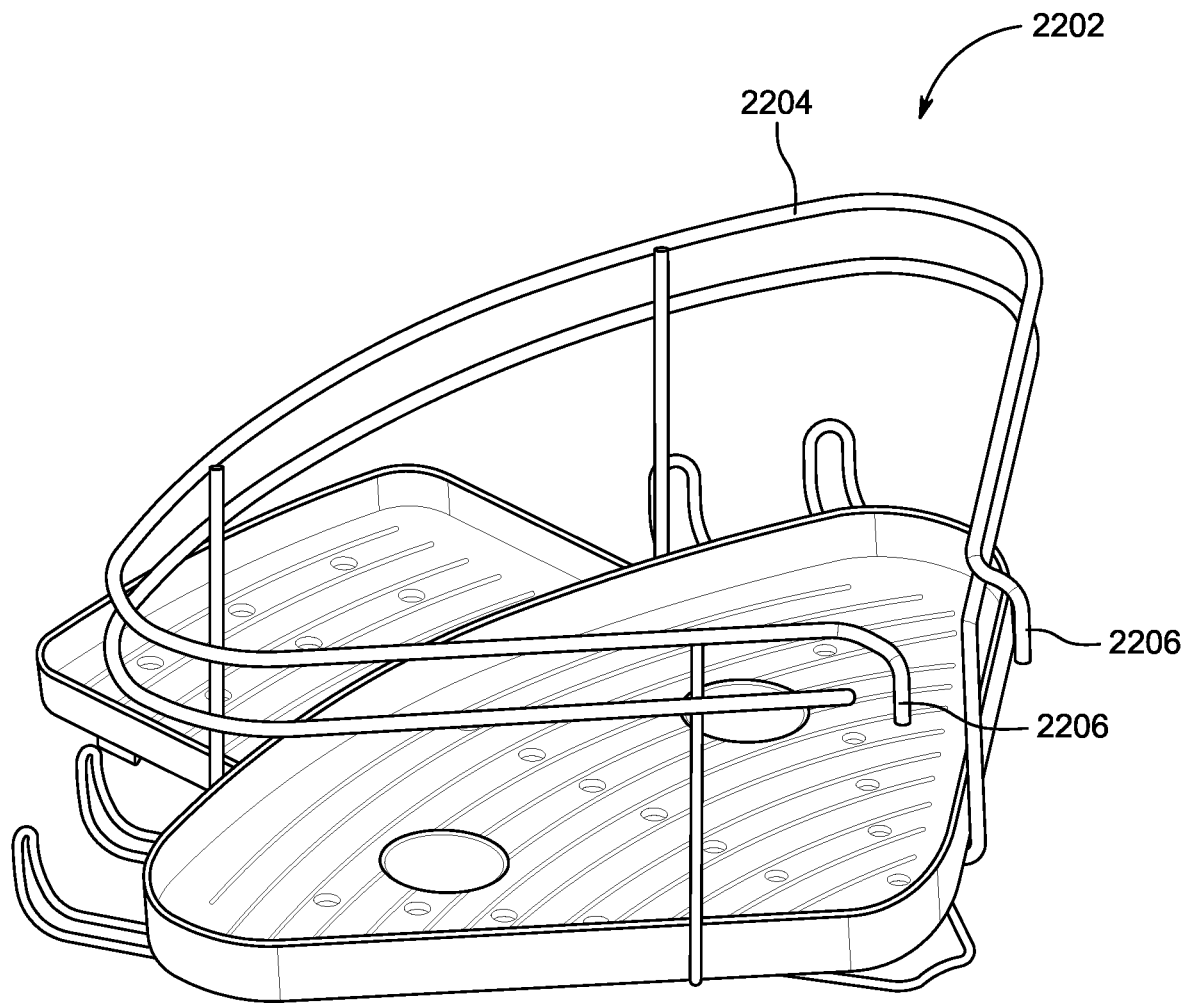
FIG. 22 illustrates a shelf that may be affixed to an exemplary embodiment.

FIG. 22 shows another exemplary embodiment of a shelf 2202 with a wire fence 2204 that comprises posts 2206 that are inserted into the opening 212 formed in an accessory lock 112 to secure the shelf 2202 to the pole or pipe using the accessory lock 112.

Figure 23:
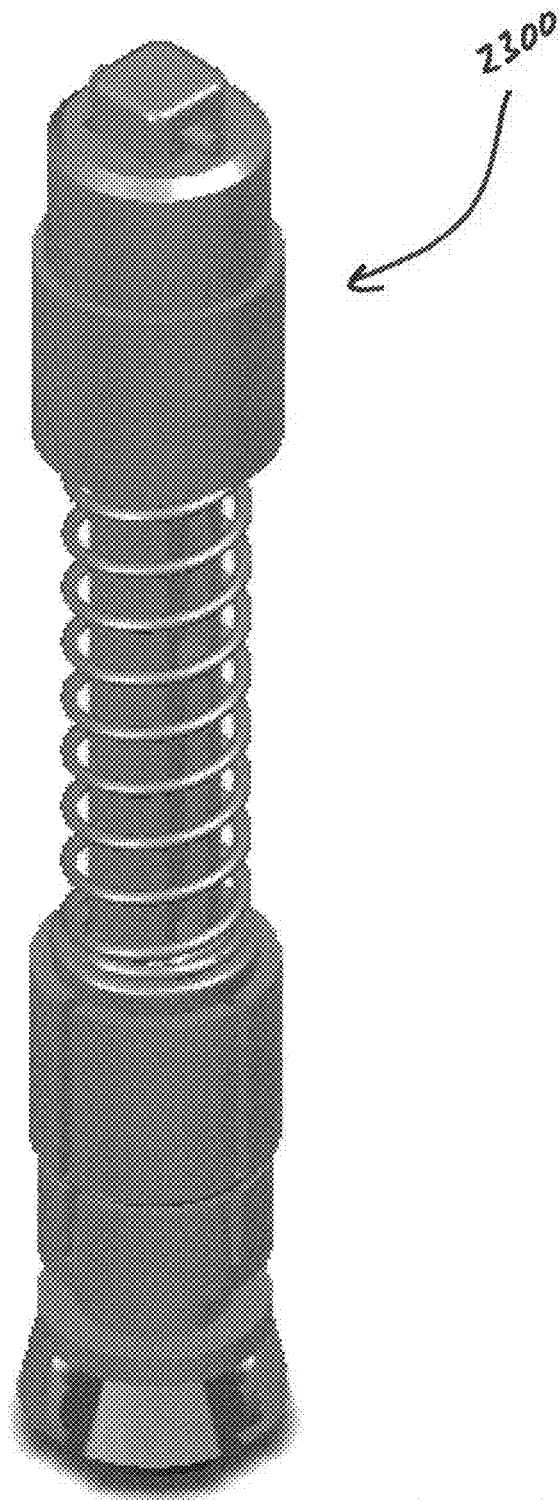
FIG. 23 illustrates a spring tension device used to support a pole such as illustrated in FIG. 1.

FIG. 23 shows a spring-loaded tension assembly 2300 that causes the pipe or pole to which an accessory lock is affixed to be secured between a ceiling and a floor.

Figure 24:
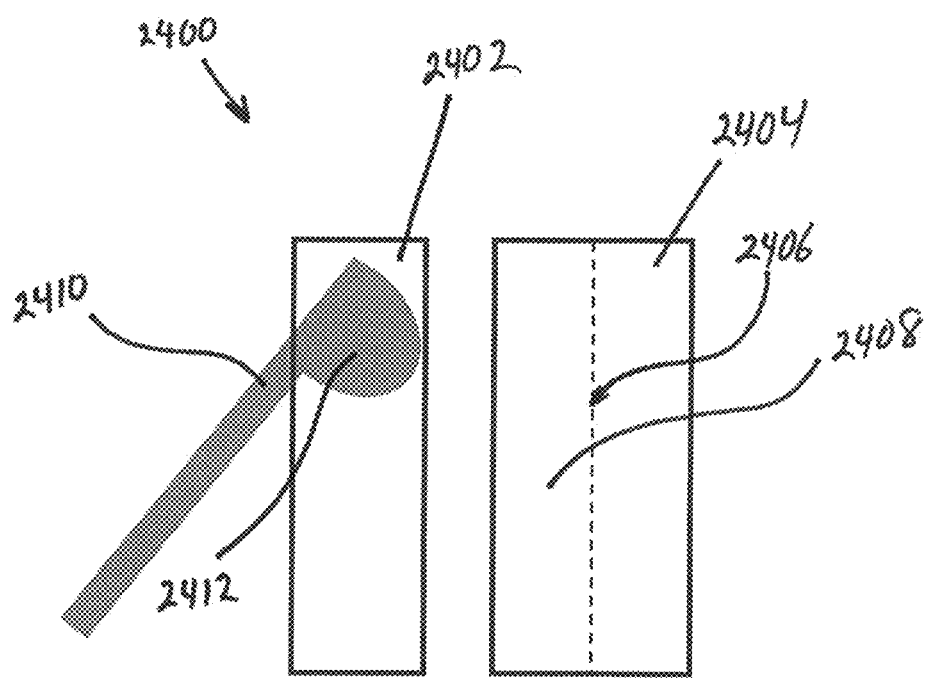
FIG. 24 illustrates an accessory lock according to exemplary embodiment.

FIG. 24 illustrates an accessory lock 2400 that comprises a clip 2402, a bracket 2404 that is configured to be removeable connected to the clip 2402 without the need to use tools. The method of removable connection can comprise a slot and mating tab arrangement as illustrated in FIGS. 16b and 17a or other methods that allow the bracket and clip to be removably connected to each other. A dashed line 2406 illustrates the boundary of a space 2408 that is formed between the clip 2402 and the bracket 2404 when they are attached to each other. When in use, the space 2408 accepts a pole or other structure (not illustrated). Shown in FIG. 24 is a latch 2410. In the exemplary embodiment shown, the latch 2410 has lobe portion 2412 that rotates into the space 2408 when the latch 2410 is actuated. In the illustrated exemplary embodiment, this serves to reduce the space 2408 formed between the clip 2402 and bracket 2404 to secure the accessory lock 2400 to a pole (not shown) located within the spaced 2408 formed between the clip 2402 and bracket 2404. As mentioned above, in exemplary embodiments, the accessory lock 2400 is secured to the pole with the latch/lever without insertion of a separate sleeve, a separate wedge, or other separate structure against the pole.

In some exemplary embodiments, the flip lock components are molded from polyethylene terephthalate (PET). In other embodiments, the flip lock components are molded from acrylonitrile butadiene styrene (ABS), styrene, or polypropylene (PP). In exemplary embodiments, the trays, bins, baskets, etc. are formed from soldered or welded wire, bent as shown. In other exemplary embodiments, the trays, bins, baskets, etc. are molded from plastic, such as PET, e.g., clear PET, or PP, e.g., white or colored PP.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Additionally, the steps of methods herein may generally be performed in any order, unless the context dictates that specific steps be performed in a specific order. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. An accessory lock, comprising:
   a cam clip with an arcuate inner surface;
   a cam bracket having an arcuate inner surface and a first and a second latch rib formed on an outer surface, the cam bracket having receiving slots that slideably attach to mating flanges formed on the cam clip, the cam bracket and cam clip slidably attachable together to form an opening;
   a cam tab lever with a first end formed into a tab and a second end comprising a cam shape, the cam tab lever having pivot holes aligned axially to the cam shape;
   the cam bracket comprising first holes formed in each of the first latch rib and the second latch rib; and
   a pin insertable into the pin holes of the cam tab lever and the first holes formed in the first rib and the second rib such that the cam tab lever is movably attached to the cam bracket, the cam shape of the cam tab lever oriented to enter the opening as the cam tab lever is moved.

2. The accessory lock of claim 1, wherein the cam bracket is formed with an opening located between the first and the second latch rib.

3. The accessory lock of claim 2, further comprising a tension plate, the tension plate comprising a tab with pins formed at each end of an edge of the tension plate, the pins insertable into second holes formed in each of the first latch rib and the second latch rib.

4. The accessory lock of claim 3, wherein the tab of the tension plate forms an arcuate shape.

5. The accessory lock of claim 3, wherein the opening is sized to permit a portion of the tension plate to enter the opening.

6. The accessory lock of claim 3, wherein the cam bracket comprises a flexible member located in the opening, the member oriented such that it is caused by the lobe to enter an arcuate space formed by the arcuate inner surface of the cam bracket when the latch lever is rotated around the axis of the pins formed in the cam.

7. The accessory lock of claim 3, wherein the tension plate further comprises a curved portion forming an integral hook.

8. The accessory lock of claim 3, wherein the cam tab lever is configured such that a lobe of the cam shape contacts the tension plate such that the plate intrudes into an arcuate space formed by the arcuate inner surface of the cam bracket when the cam tab lever is in a first position and does not intrude into the arcuate space when the cam tab lever is in a second position.

9. The accessory lock of claim 3, wherein the tab portion of the tension plate comprises an arcuate surface on one face of the tension plate.

* * * * *